US009289711B2

(12) United States Patent
Hirakawa et al.

(10) Patent No.: US 9,289,711 B2
(45) Date of Patent: Mar. 22, 2016

(54) PLUGGED HONEYCOMB STRUCTURE

(71) Applicant: NGK Insulators, Ltd., Nagoya (JP)

(72) Inventors: Toshihiro Hirakawa, Nagoya (JP); Toshio Yamada, Nagoya (JP); Satoshi Sakashita, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 105 days.

(21) Appl. No.: 14/014,682

(22) Filed: Aug. 30, 2013

(65) Prior Publication Data

US 2014/0059987 A1 Mar. 6, 2014

(30) Foreign Application Priority Data

Sep. 6, 2012 (JP) .................................. 2012196680

(51) Int. Cl.
| | |
|---|---|
| *B01D 39/06* | (2006.01) |
| *B01D 39/20* | (2006.01) |
| *B01D 39/14* | (2006.01) |
| *B01D 24/00* | (2006.01) |
| *B01D 46/24* | (2006.01) |

(52) U.S. Cl.
CPC .......... *B01D 46/2429* (2013.01); *B01D 46/247* (2013.01); *B01D 46/2466* (2013.01)

(58) Field of Classification Search
CPC .......... B01D 46/2418; B01D 46/2451; B01D 46/247; B01D 46/242
See application file for complete search history.

(56) References Cited

U.S. PATENT DOCUMENTS

| | | | |
|---|---|---|---|
| 4,417,908 A | 11/1983 | Pitcher, Jr. | |
| 6,803,087 B2 * | 10/2004 | Brew et al. | 428/116 |
| 7,504,146 B2 * | 3/2009 | Ando et al. | 428/116 |
| 7,658,779 B2 * | 2/2010 | Carranza et al. | 55/523 |
| 8,016,906 B2 * | 9/2011 | Zawisza | 55/523 |
| 8,236,083 B2 * | 8/2012 | Garcia et al. | 55/523 |
| 2003/0165662 A1 | 9/2003 | Suwabe et al. | |
| 2005/0076627 A1 * | 4/2005 | Itou et al. | 55/523 |
| 2005/0274097 A1 * | 12/2005 | Beall et al. | 55/523 |
| 2007/0128405 A1 * | 6/2007 | Sakaguchi et al. | 428/116 |
| 2008/0124517 A1 * | 5/2008 | Beall et al. | 428/118 |

(Continued)

FOREIGN PATENT DOCUMENTS

| | | |
|---|---|---|
| EP | 2 505 254 | 10/2012 |
| FR | 2 946 892 | 12/2010 |

(Continued)

OTHER PUBLICATIONS

Extended European Search Report, European Application No. 13182736.2, dated Dec. 17, 2013 (5 pages).

*Primary Examiner* — Amber R Orlando
(74) *Attorney, Agent, or Firm* — Burr & Brown, PLLC

(57) ABSTRACT

A plugged honeycomb structure including a honeycomb structure body, outflow side plugged portions, and inflow side plugged portions. A shape of cells in a cross section is a hexagonal shape. Among six corner portions of each of the hexagonal cells, the corner portion between two partition walls at least one of which is the partition wall separating inflow cells or outflow cells from each other is a specific corner portion, and the corner portion between the two partition walls each of which is the partition wall separating the inflow cell and the outflow cell is an unspecific corner portion. At least one of the specific corner portions is provided with a reinforcing portion so that a shape of the specific corner portion is rounded, and the unspecific corner portions are not provided with the reinforcing portions.

17 Claims, 14 Drawing Sheets

(56) References Cited

U.S. PATENT DOCUMENTS

| | | |
|---|---|---|
| 2009/0205301 A1 | 8/2009 | Komori et al. |
| 2010/0247852 A1* | 9/2010 | Yamada et al. ............... 428/116 |
| 2010/0300291 A1 | 12/2010 | Vincent et al. |
| 2011/0236626 A1* | 9/2011 | Saito et al. .................... 428/116 |
| 2013/0055694 A1* | 3/2013 | Salmona et al. ................ 55/523 |

FOREIGN PATENT DOCUMENTS

| | | |
|---|---|---|
| JP | H3-49608 B | 7/1991 |
| JP | 2001-334114 A | 12/2001 |
| JP | 2003-269131 A | 9/2003 |
| JP | 2009-537741 A | 10/2009 |
| WO | 2008/066795 | 6/2008 |

\* cited by examiner

PLUGGED HONEYCOMB STRUCTURE

The present application is an application based on JP-2012-196680 filed on Sep. 6, 2012 with the Japanese Patent Office, the entire contents of which are incorporated herein by reference.

BACKGROUND OF THE INVENTION

1. Field of the Invention

The present invention relates to a plugged honeycomb structure, and more particularly, it relates to a plugged honeycomb structure capable of enhancing an isostatic strength and suppressing an increase in pressure loss and a decrease in capacity of deposited ash.

2. Description of Related Art

In exhaust gases discharged from an internal combustion engine such as a diesel engine, various burning devices, and the like, a large amount of particulate matter mainly composed of soot is included. Hereinafter, the particulate matter will be abbreviated to the "PM". When the PM in the exhaust gas is discharged to the atmosphere as it is, an environmental pollution is caused. Therefore, in an exhaust system of the exhaust gas, a diesel particulate filter for collection of the PM is disposed. Hereinafter, the diesel particulate filter will be abbreviated to the "DPF".

As the DPF, there has been used, for example, a honeycomb structure body having porous partition walls with which a plurality of cells are formed to define through channels of the exhaust gas and a purified gas. In this honeycomb structure body, plugged portions to plug open frontal areas of the cells are arranged in the open frontal areas of the predetermined cells at an end surface on an outflow side of the purified gas, and the open frontal areas of the remaining cells at an end surface on an inflow side of the exhaust gas, so that the honeycomb structure body is utilized as a plugged honeycomb structure (a honeycomb filter).

In the above plugged honeycomb structure, when the exhaust gas is allowed to flow into the inflow cells, particulates in the exhaust gas are collected by the partition walls during passage of the exhaust gas through the partition walls, and the purified gas from which the particulates have been removed is discharged from the outflow cells.

Heretofore, in the DPF, various catalysts have been loaded onto the partition walls of the plugged honeycomb structure, to perform purification of harmful components and the like in the exhaust gas. Moreover, as a honeycomb structure body for the purpose of uniformly loading the catalyst onto the partition walls, a honeycomb structure body having a hexagonal sectional shape in a cell extending direction has been suggested (e.g., see Patent Documents 1 to 3). Hereinafter, "cells having a hexagonal sectional shape in the cell extending direction" will be referred to as "the hexagonal cells". Furthermore, a honeycomb structure body having porous partition walls with which the hexagonal cells are formed will be referred to as "the honeycomb structure body of the hexagonal cells".

Additionally, a plugged honeycomb structure using the honeycomb structure body of the hexagonal cells will be referred to as "the plugged honeycomb structure of the hexagonal cells".

Heretore, technologies have been suggested to prevent damages being caused to intersections of partition walls of a honeycomb structure body due to an excessively large heat shock or mechanical shock. For example, there has been suggested a ceramic honeycomb structure body in which one of facing corner portions is provided with a round portion having a substantially circular shape, in at least part of through channels (cells) in a cross section which is orthogonal to an axial direction (see, e.g., Patent Document 4).

[Patent Document 1] JP-B-H03-49608
[Patent Document 2] JP-T-2009-537741
[Patent Document 3] JP-A-2001-334114
[Patent Document 4] JP-A-2003-269131

SUMMARY OF THE INVENTION

However, a honeycomb structure body of hexagonal cells disadvantageously has a low isostatic strength, as compared with a honeycomb structure body of cells having a quadrangular sectional shape in a cell extending direction. Moreover, when cracks are generated in a part (one portion) of the honeycomb structure body of the hexagonal cells, the honeycomb structure body has the problem that the cracks easily extend over the whole honeycomb structure body.

On the other hand, in such a ceramic honeycomb structure body having round portions as disclosed in Patent Document 4, it is possible to enhance the isostatic strength and prevent the extension of the cracks. However, since the above-mentioned round portions are disposed, an effective area (hereinafter also referred to as "a filter area") of each of partition walls through which an exhaust gas is actually filtered decreases. Therefore, when the round portions are arranged in corner portions of all cells, a pressure loss increases, and a capacity of deposited ash decreases in a plugged honeycomb structure. It is to be noted that "the capacity of the deposited ash" is an ability to collect and contain the ash in the plugged honeycomb structure without having any serious influence on the pressure loss of the plugged honeycomb structure. It is difficult to purify the ash by a catalyst or the like. Therefore, as the capacity of the deposited ash increases, the increase in pressure loss of the plugged honeycomb structure can effectively be suppressed.

The present invention has been developed in view of the above-mentioned problems, and an object thereof is to provide a plugged honeycomb structure capable of enhancing an isostatic strength and suppressing an increase in pressure loss and a decrease in capacity of deposited ash.

According to the present invention, a plugged honeycomb structure is provided as follows,

[1] A plugged honeycomb structure comprising: a honeycomb structure body having porous partition walls with which a plurality of cells extending from an inflow side end surface to an outflow side end surface are formed to define through channels of a fluid; outflow side plugged portions arranged in open frontal areas of the predetermined cells at the outflow side end surface; and inflow side plugged portions arranged in open frontal areas the remaining cells at the inflow side end surface, wherein a shape of the cells in a cross section perpendicular to an extending direction of the cells is a hexagonal shape, and when among six corner portions of each of the hexagonal cells, the corner portion between two sides which are the two partition walls constituting the corner portion and at least one of which is the partition wall separating the inflow cells or the outflow cells from each other is a specific corner portion, and the corner portion between two sides which are the two partition walls constituting the corner portion and each of which is the partition wall separating the inflow cell and the outflow cell is an unspecific corner portion, the inflow cells being open at the inflow side end surface and being plugged with the outflow side plugged portions at the outflow side end surface, the outflow cells being open at the outflow side end surface and being plugged with the inflow side plugged portions at the inflow side end surface, at least one of the specific corner portions is provided with a reinforcing portion so that a shape of the specific corner portion is rounded, and the unspecific corner portions are not provided with the reinforcing portions.

[2] The plugged honeycomb structure according to the above [1], wherein only the specific corner portions between two sides which are the partition walls separating the inflow cells or the outflow cells from each other are provided with the reinforcing portion.

[3] The plugged honeycomb structure according to the above [1] or [2], wherein a ratio of the number of the specific corner portions provided with the reinforcing portions to the number of the specific corner portions is 10% or more.

[4] The plugged honeycomb structure according to the above [3], wherein the ratio of the number of the specific corner portions provided with the reinforcing portions to the number of the specific corner portions is 10% or more and 80% or less.

[5] The plugged honeycomb structure according to any one of the above [1] to [4], wherein a ratio of a total area covered by the reinforcing portions in the cross section perpendicular to the cell extending direction to a sum of areas of the cells in the cross section perpendicular to the cell extending direction is 20% or less.

[6] The plugged honeycomb structure according any one of the above [1] to [5], wherein only the specific corner portions of the outflow cells are provided with the reinforcing portions.

[7] The plugged honeycomb structure according to any one of the above [1] to [6], wherein a shape of the inflow cells in the cross section perpendicular to the cell extending direction is different from a shape of the outflow cells in the cross section perpendicular to the cell extending direction.

[8] The plugged honeycomb structure according to any one of the above [1] to [7], wherein a sum of areas of through channel portions of the inflow cells in the cross section perpendicular to the cell extending direction is larger than a sum of areas of through channel portions of the outflow cells in the cross section perpendicular to the cell extending direction.

[9] The plugged honeycomb structure according to any one of the above [1] to [8], wherein in the cross section of the honeycomb structure body which is perpendicular to the cell extending direction, 70% or more of the specific corner portions provided with the reinforcing portions are present in a region of a length from an outer peripheral edge of the honeycomb structure body in a normal direction of the outer peripheral edge, the length corresponding to the length of ⅓ or less of a length of a long axis of the outer peripheral edge.

Effect of the Invention

A plugged honeycomb structure of the present invention includes a honeycomb structure body, outflow side plugged portions, and inflow side plugged portions, and a cell shape in a cross section perpendicular to a cell extending direction is a hexagonal shape. In the plugged honeycomb structure of the present invention, six corner portions of each of the hexagonal cells include "specific corner portions" and "unspecific corner portions" as described below. Moreover, in the plugged honeycomb structure of the present invention, at least one of the specific corner portions is provided with a reinforcing portion so that a shape of the specific corner portion is rounded. That is, the at least one specific corner portion is provided with the above reinforcing portion, and the unspecific corner portions are not provided with the above reinforcing portions. "The specific corner portion" is a corner portion between two sides which are two partition walls constituting the corner portion and at least one of which is the partition wall separating the inflow cells or the outflow cells from each other. "The unspecific corner portion" is a corner portion between two sides which are two partition walls constituting the corner portion and each of which is the partition wall separating the inflow cell and the outflow cell.

In the plugged honeycomb structure of the hexagonal cells, from relations in shape and arrangement between the cells, "the specific corner portions" and "the unspecific corner portions" are present as described above. Here, in the plugged honeycomb structure, a fluid (an exhaust gas) which has flowed into the inflow cells from an inflow side end surface permeates the partition walls each separating the inflow cell and the outflow cell, moves to the outflow cells, and is discharged as a purified gas from an outflow side end surface. That is, in the plugged honeycomb structure of the hexagonal cells, the movement (the permeation) of the fluid through the partition walls is mainly performed through the partition walls each separating the inflow cell and the outflow cell. Therefore, the movement of the fluid through the partition walls each separating the inflow cell and the outflow cell has a large influence on a pressure loss of the plugged honeycomb structure. In particular, when the exhaust gas which has flowed into the cells from the inflow side end surface is discharged as the purified gas from the outflow side end surface, the movement of the exhaust gas through the partition walls each separating the inflow cell and the outflow cell is essentially required. On the other hand, in the partition walls each separating the inflow cells or the outflow cells from each other, a differential pressure between the inflow cells or the outflow cells is hardly generated, and hence the movement (the permeation) of the fluid through the partition walls is scarcely performed. Therefore, it can be considered that the movement of the fluid through the partition walls each separating the inflow cells or the outflow cells from each other has remarkably little influence on the pressure loss, as compared with the movement of the fluid through the partition walls each separating the inflow cell and the outflow cell.

In the plugged honeycomb structure of the present invention, the at least one specific corner portion is provided with the reinforcing portion so that the shape of the specific corner portion is rounded, which can enhance an isostatic strength of the plugged honeycomb structure. Furthermore, at least one of the two partition walls constituting this specific corner portion is "the partition wall separating the inflow cells or the outflow cells from each other" which has a less influence on the pressure loss. Therefore, even when this specific corner portion is provided with the reinforcing portion, it is possible to suppress an increase in pressure loss and a decrease in capacity of deposited ash, as compared with a case where the unspecific corner portions are provided with the reinforcing portions.

DETAILED DESCRIPTION OF THE INVENTION

Hereinafter, embodiments of the present invention will specifically be described with reference to the drawings, but it should be understood that the present invention is not limited to the following embodiments and that the following embodiments to which modifications, improvements and the like are suitably added on the basis of ordinary knowledge of a person skilled in the art without departing from the gist of the present invention also fall in the gist of the present invention.

Figure 1:
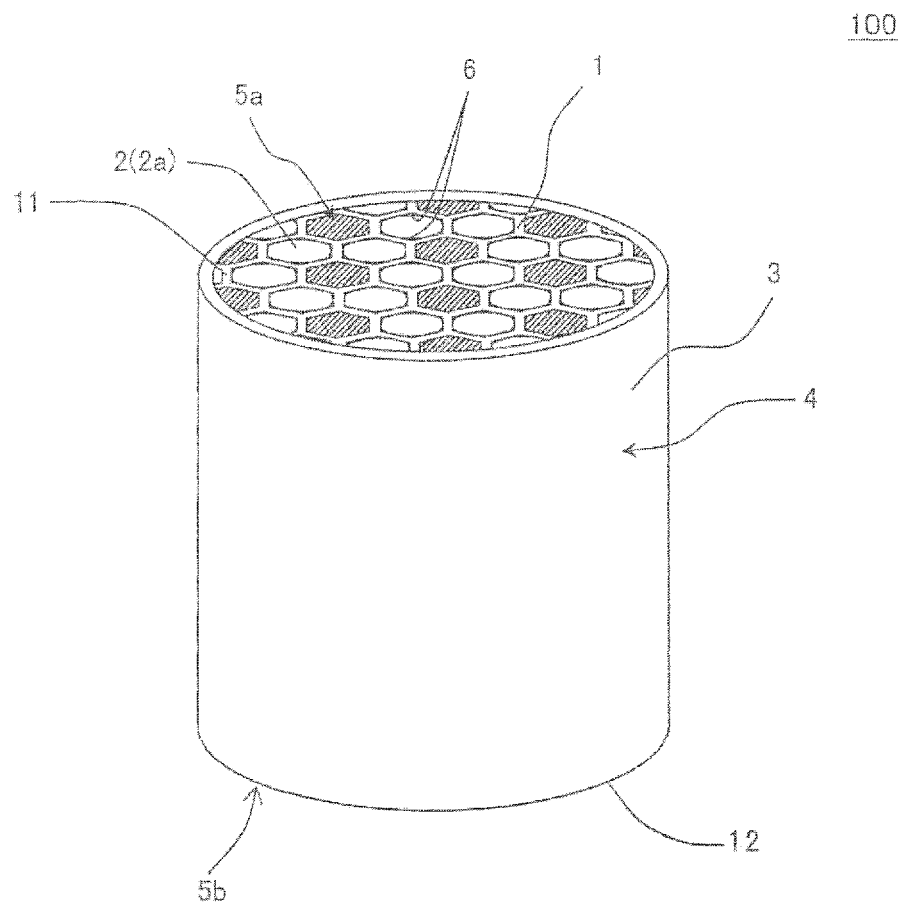
FIG. 1 is a perspective view schematically showing one embodiment of a plugged honeycomb structure of the present invention.
Figure 2:
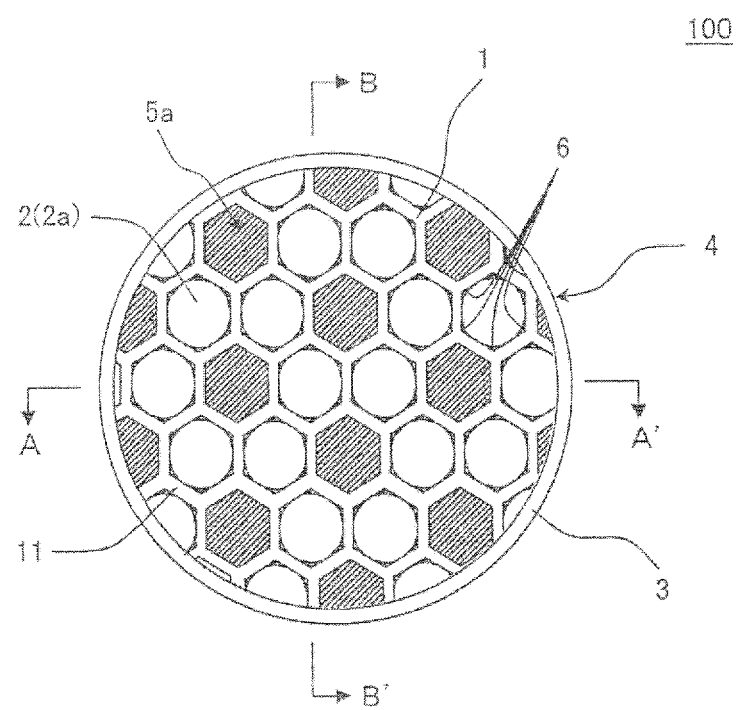
FIG. 2 is a plan view schematically showing an inflow side end surface of the one embodiment of the plugged honeycomb structure of the present invention.
Figure 3A:
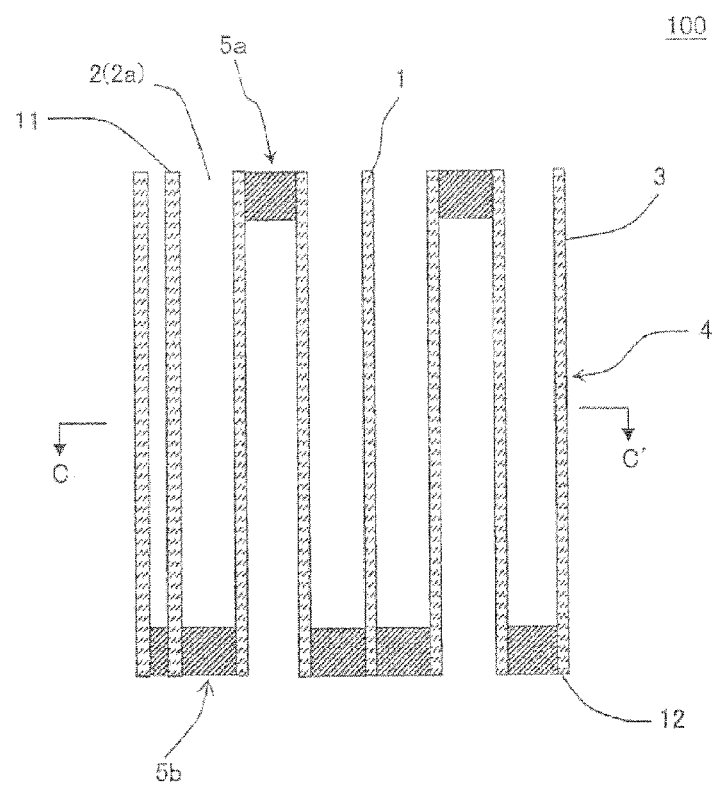
FIG. 3A is a cross sectional view schematically showing a cross section cut along the A-A line of FIG. 2.
Figure 3B:
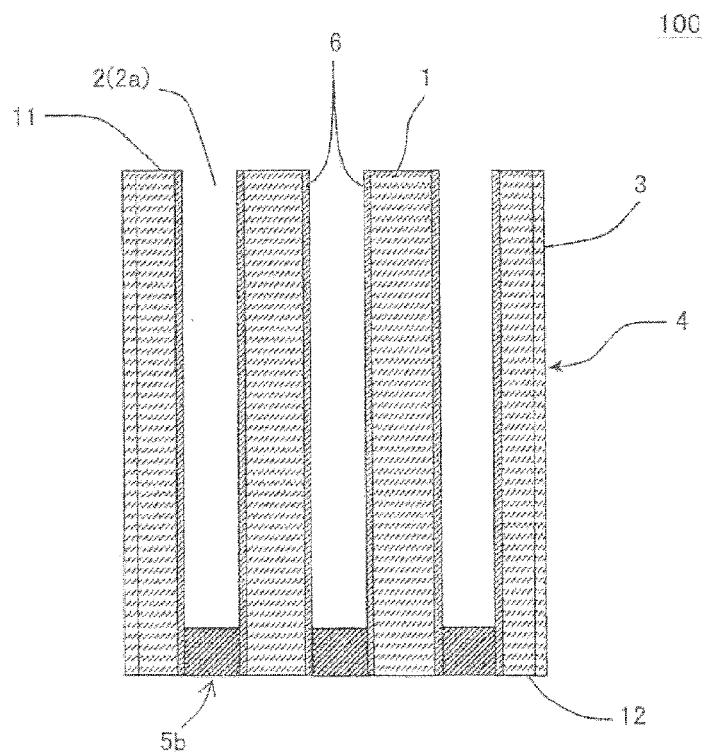
FIG. 3B is a cross sectional view schematically showing a cross section cut along the B-B' line of FIG. 2.
Figure 4A:
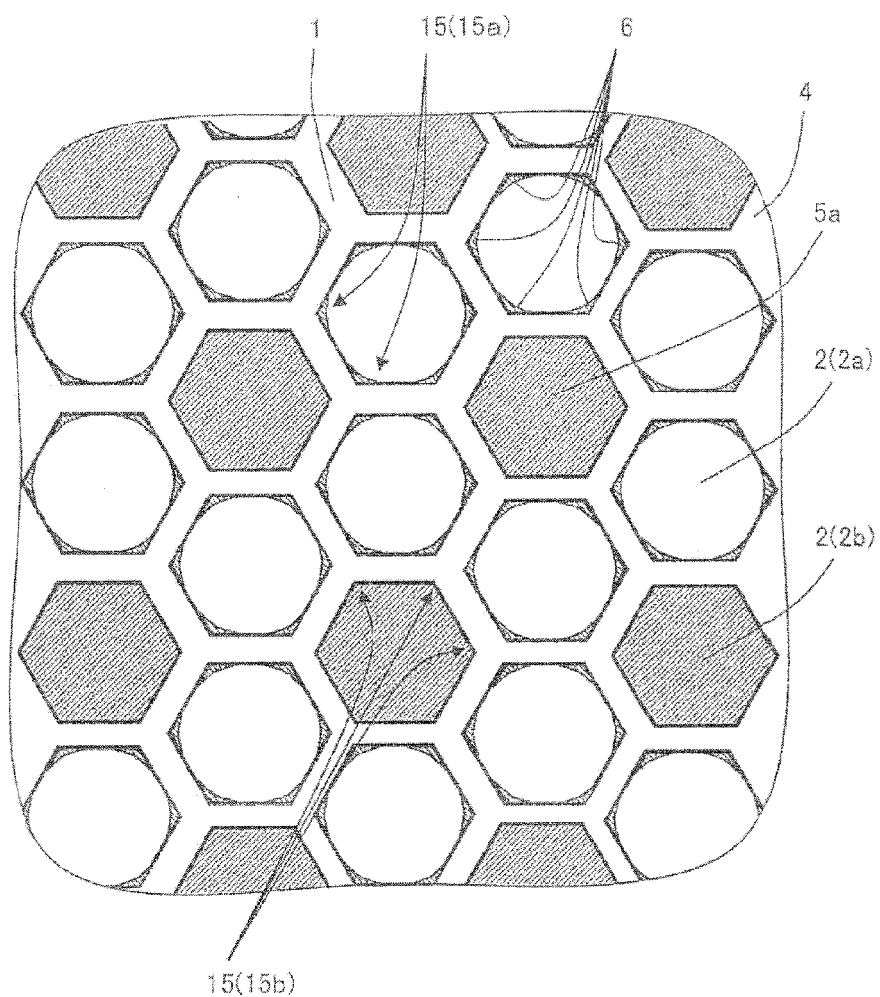
FIG. 4A is a schematic view showing an enlarged part of the inflow side end surface of the one embodiment of the plugged honeycomb structure of the present invention.
Figure 4B:
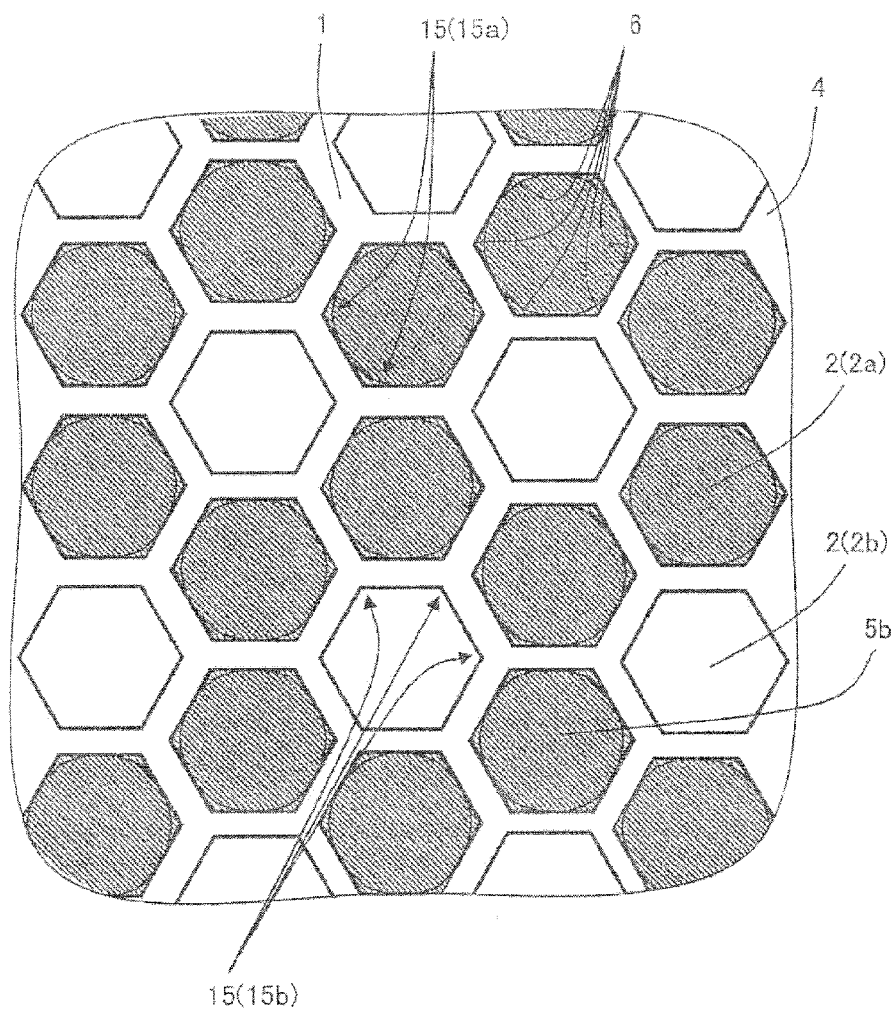
FIG. 4B is a schematic view showing an enlarged part of an outflow side end surface of the one embodiment of the plugged honeycomb structure of the present invention.
Figure 4C:
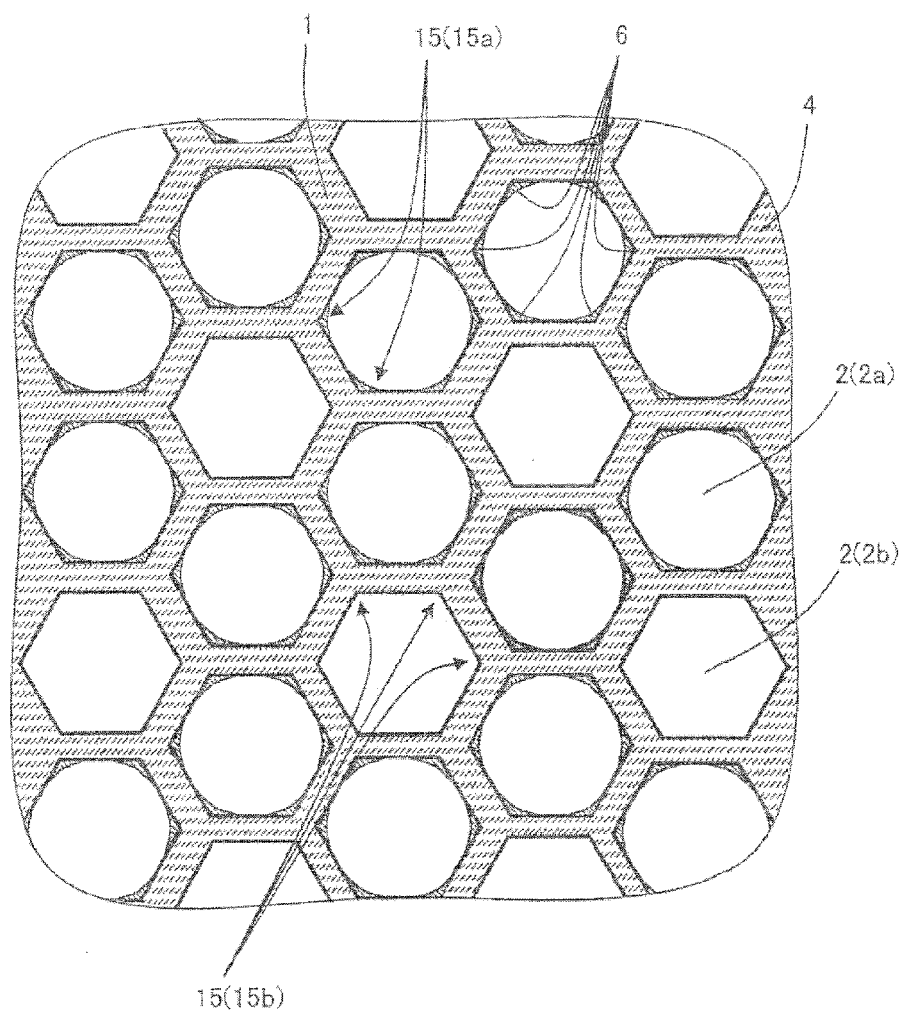
FIG. 4C is a schematic view showing an enlarged part of a cross section cut along the C-C' line of FIG. 3A.
Figure 5:
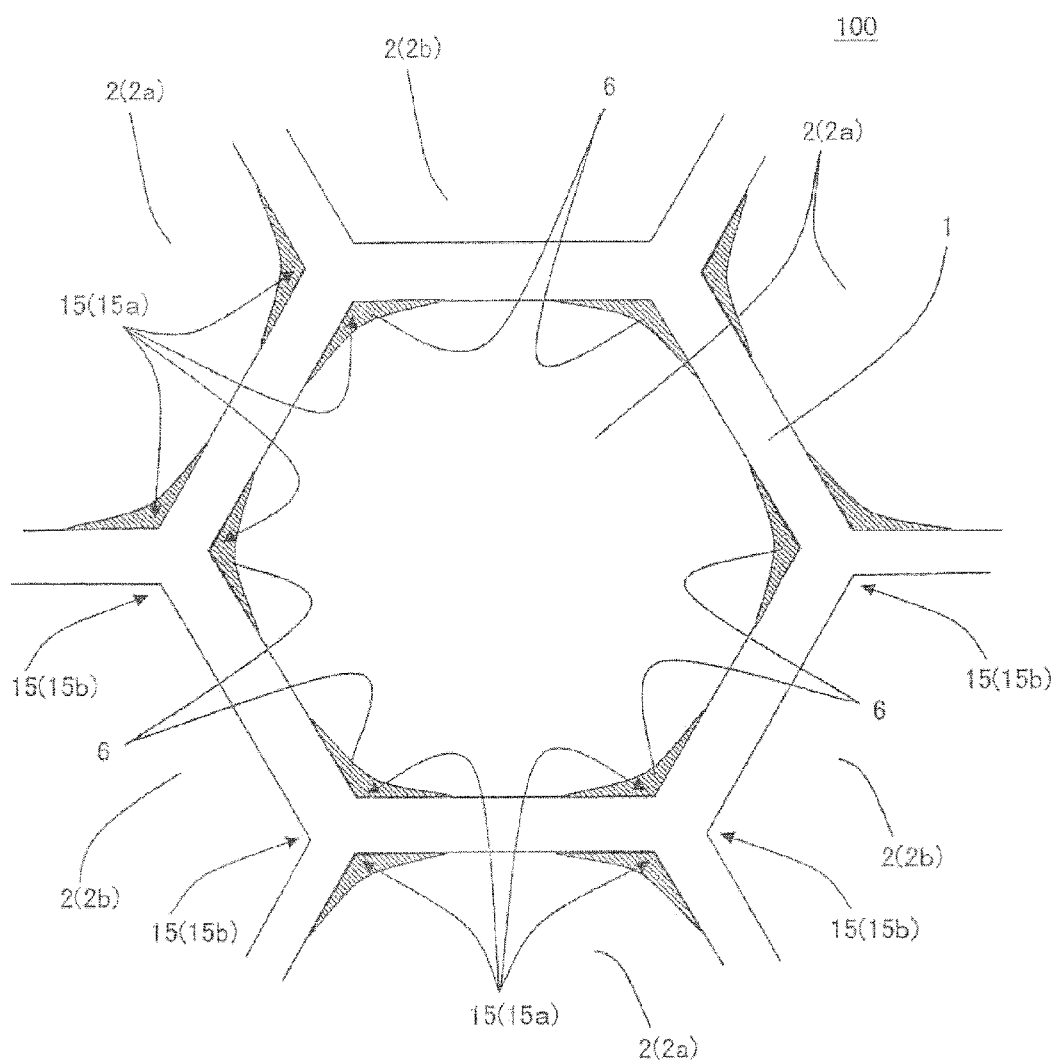
FIG. 5 is a schematic view showing one example of inflow cells seen from the inflow side end surface in the one embodiment of the plugged honeycomb structure of the present invention.

(1) Plugged Honeycomb Structure:

One embodiment of a plugged honeycomb structure of the present invention is a plugged honeycomb structure 100 shown in FIG. 1 and FIG. 2. Here, FIG. 1 is a perspective view schematically showing the one embodiment of the plugged honeycomb structure of the present invention. FIG. 2 is a plan view schematically showing an inflow side end surface of the one embodiment of the plugged honeycomb structure of the present invention. FIG. 3A is a cross sectional view schematically showing a cross section cut along the A-A' line of FIG. 2. FIG. 3B is a cross sectional view schematically showing a cross section cut along the B-B' line of FIG. 2. FIG. 4A is a schematic view showing an enlarged part of the inflow side end surface of the one embodiment of the plugged honeycomb structure of the present invention. FIG. 4B is a schematic view showing an enlarged part of an outflow side end surface of the one embodiment of the plugged honeycomb structure of the present invention. FIG. 4C is a schematic view showing an enlarged part of a cross section cut along the C-C' line of FIG. 3A. FIG. 5 is a schematic view showing one example of inflow cells seen from the inflow side end surface in the one embodiment of the plugged honeycomb structure of the present invention.

As shown in FIG. 1, FIG. 2, FIG. 3A, FIG. 3B, FIG. 4A to FIG. 4C, and FIG. 5, the plugged honeycomb structure 100 of the present embodiment includes a honeycomb structure body 4, outflow side plugged portions 5b, and inflow side plugged portions 5a. "The honeycomb structure body 4" has porous partition walls 1 with which a plurality of cells 2 extending from an inflow side end surface 11 to an outflow side end surface 12 are formed to define through channels of a fluid. "The outflow side plugged portions 5b" are arranged in open frontal areas of the predetermined cells 2 at the outflow side end surface 12. The cells 2 in which the outflow side plugged portions 5b are arranged are inflow cells 2a which are open at the inflow side end surface 11 and plugged with the outflow side plugged portions 5b at the outflow side end surface 12. "The inflow side plugged portions 5a" are arranged in open frontal areas of the remaining cells 2 at the inflow side end surface 11. The cells 2 in which the inflow side plugged portions 5a are arranged are outflow cells 2b which are open at the outflow side end surface 12 and plugged with the inflow side plugged portions 5a at the inflow side end surface 11.

In the plugged honeycomb structure 100 of the present embodiment, a shape of the cells 2 in a cross section perpendicular to an extending direction of the cells 2 is a hexagonal shape. Hereinafter, the shape of the cells 2 in the cross section perpendicular to the extending direction of the cells 2" will simply be referred to as the shape of the cells 2" sometimes. Moreover, "the cells 2 having a hexagonal shape of the cells 2" will be referred to as the hexagonal cells 2" sometimes. The shape of the hexagonal cells 2 is not limited to a regular hexagonal shape as long as the hexagonal shape has six corner portions 15. That is, there is not any special restriction on a size of an angle of each of the corner portions 15 of each of the hexagonal cells 2 (i.e., each inner angle of the hexagonal shape).

Figure 9A:
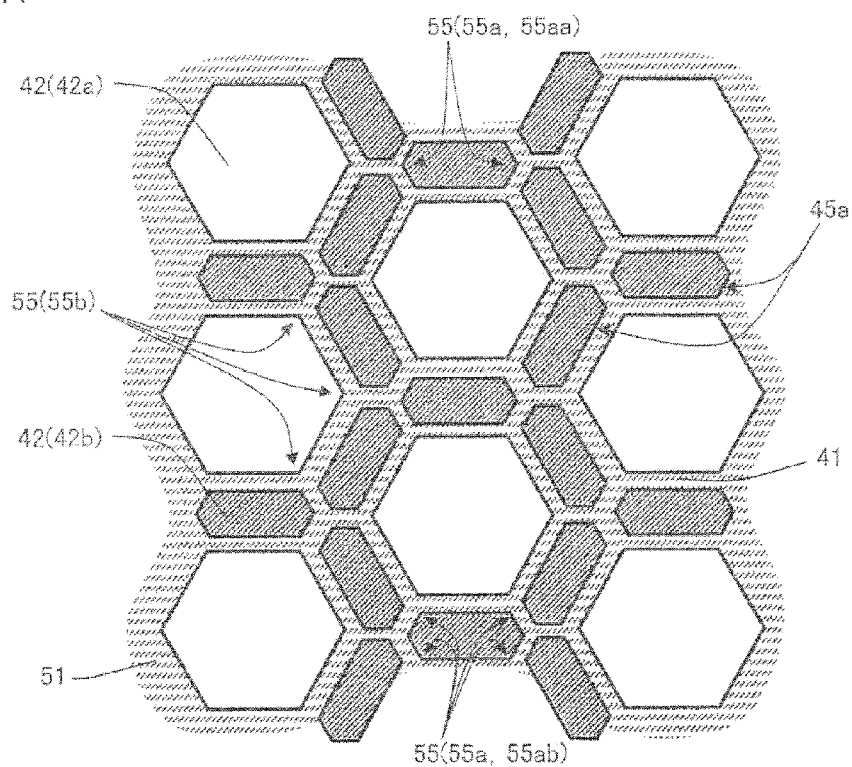
FIG. 9A is a schematic view showing an enlarged part of the inflow side end surface of the still another embodiment of the plugged honeycomb structure of the present invention.
Figure 9B:
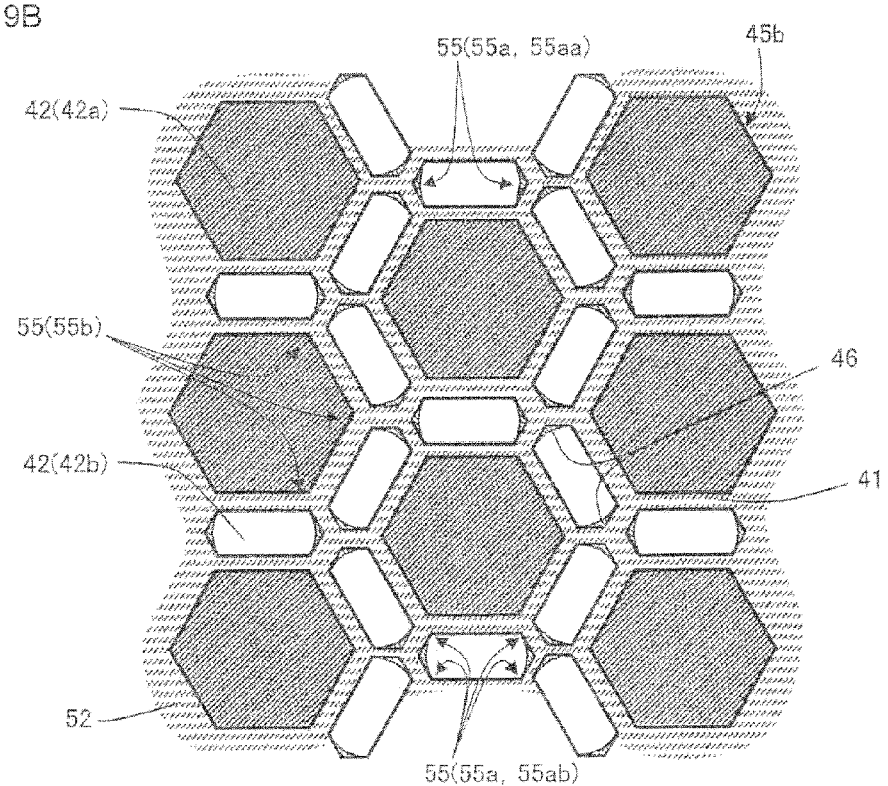
FIG. 9B is a schematic view showing an enlarged part of an outflow side end surface of the still another embodiment of the plugged honeycomb structure of the present invention.
Figure 10:
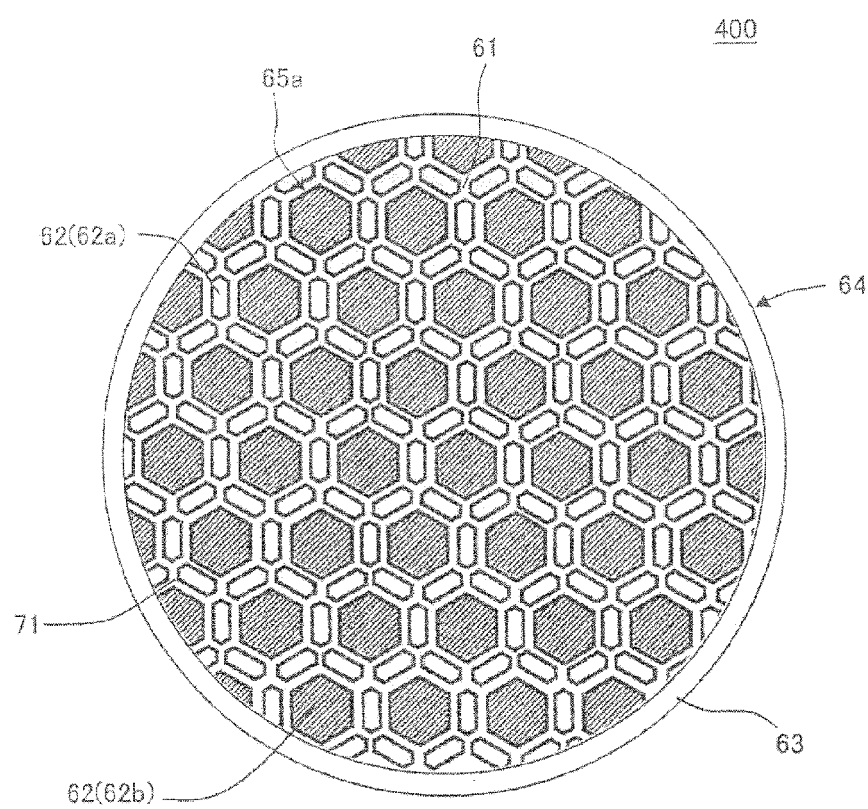
FIG. 10 is a plan view schematically showing an inflow side end surface of a further embodiment of the plugged honeycomb structure of the present invention.
Figure 11A:
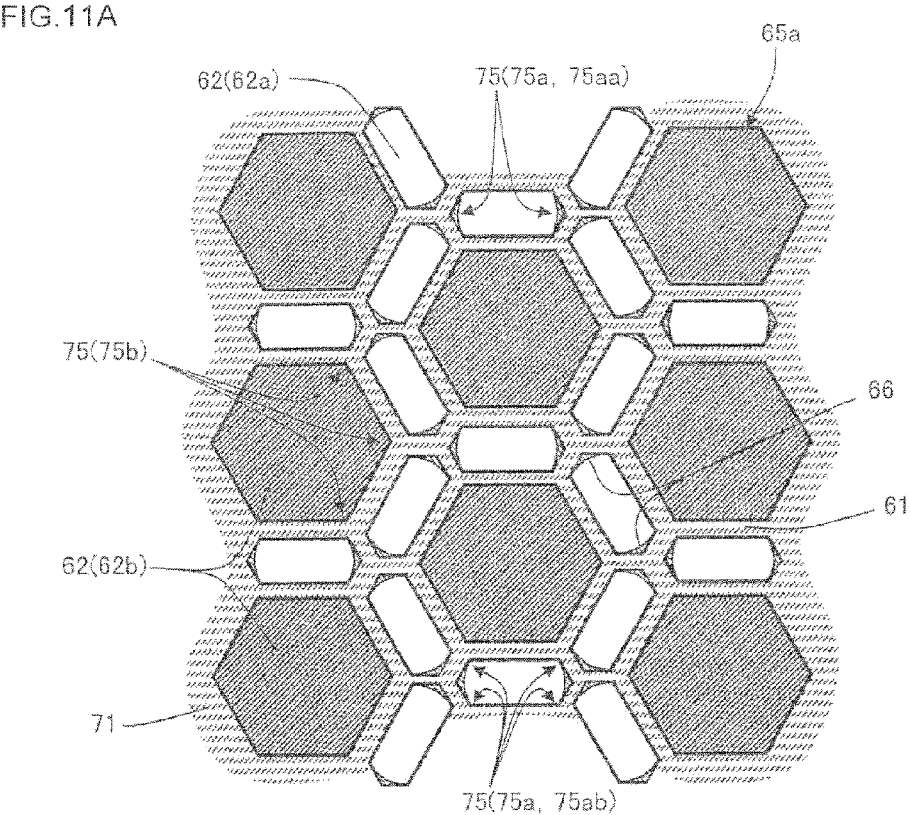
FIG. 11A is a schematic view showing an enlarged part of the inflow side end surface of the further embodiment of the plugged honeycomb structure of the present invention.
Figure 11B:
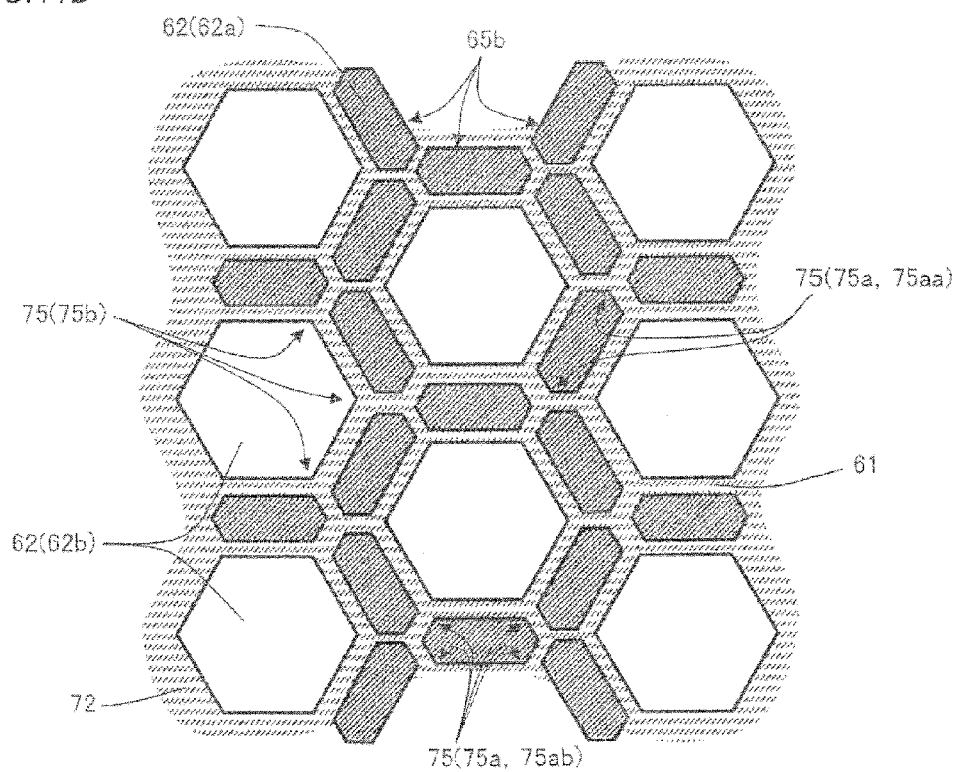
FIG. 11B is a schematic view showing an enlarged part of an outflow side end surface of the further embodiment of the plugged honeycomb structure of the present invention.

Moreover, in the plugged honeycomb structure, the shape of all the hexagonal cells may be the same shape, or the shape of the hexagonal cells may vary with the respective cells. For example, the shape of the inflow cells may be different from the shape of the outflow cells in the plugged honeycomb structure. An example of such a plugged honeycomb structure is a plugged honeycomb structure 200 shown in FIG. 6, FIG. 7A and FIG. 73. Moreover, a plugged honeycomb structure 300 shown in FIG. 8, FIG. 9A and FIG. 9B and a plugged honeycomb structure 400 shown in FIG. 10, FIG. 11A and FIG. 11B are also plugged honeycomb structures in which the shape of the inflow cells is different from the shape of the outflow cells.

Figure 6:
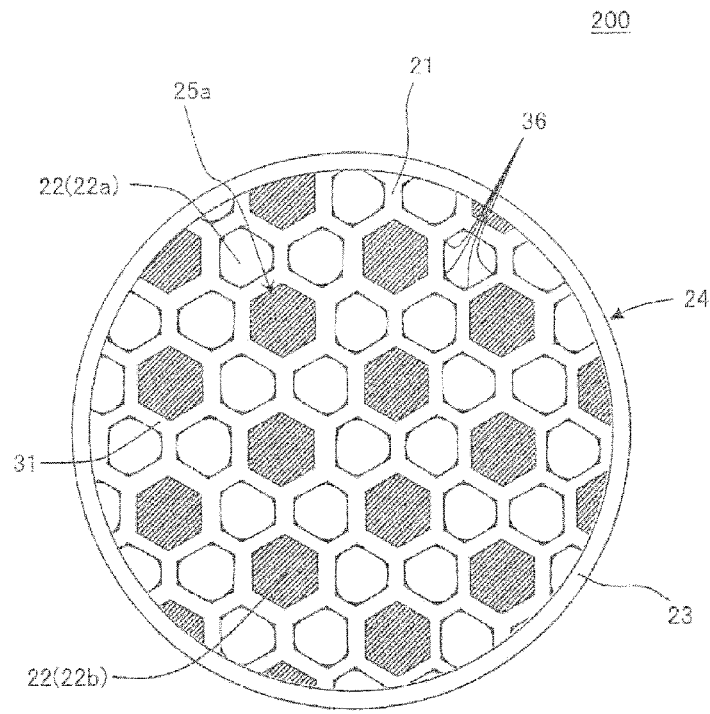
FIG. 6 is a plan view schematically showing an inflow side end surface of another embodiment of the plugged honeycomb structure of the present invention.
Figure 7A:
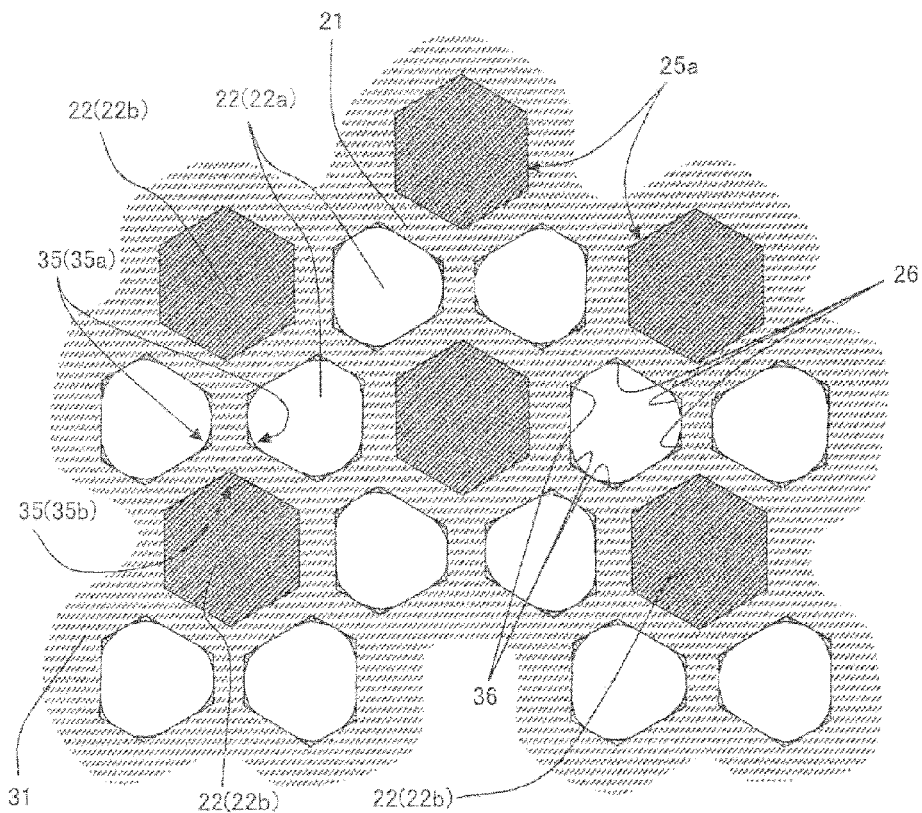
FIG. 7A is a schematic view showing an enlarged part of the inflow side end surface of the another embodiment of the plugged honeycomb structure of the present invention.
Figure 8:
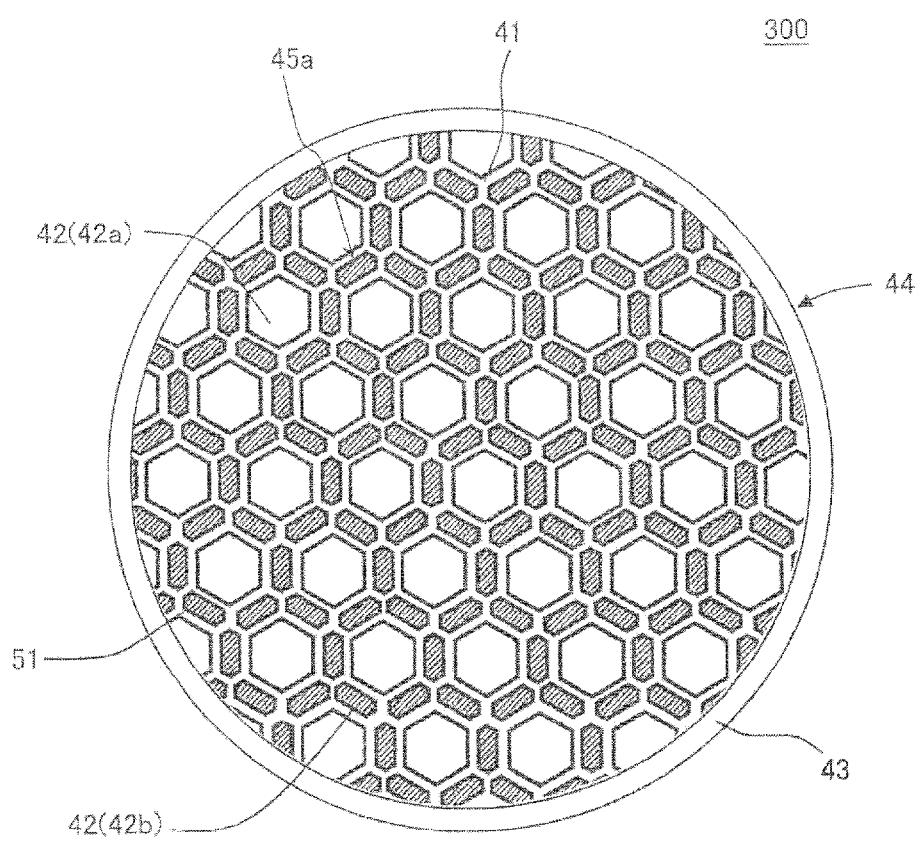
FIG. 8 is a plan view schematically showing an inflow side end surface of still another embodiment of the plugged honeycomb structure of the present invention.

Here, FIG. 6 is a plan view schematically showing an inflow side end surface of another embodiment of the plugged honeycomb structure of the present invention. FIG. 7A is a schematic view showing an enlarged part of the inflow side end surface of the another embodiment of the plugged honeycomb structure of the present invention. FIG. 73 is a schematic view showing an enlarged part of an outflow side end surface of the another embodiment of the plugged honeycomb structure of the present invention. FIG. 8 is a plan view schematically showing an inflow side end surface of still another embodiment of the plugged honeycomb structure of the present invention. FIG. 9A is a schematic view showing an enlarged part of the inflow side end surface of the still another embodiment of the plugged honeycomb structure of the present invention. FIG. 9B is a schematic view showing an enlarged part of an outflow side end surface of the still another embodiment of the plugged honeycomb structure of the present invention. FIG. 10 is a plan view schematically showing an inflow side end surface of a further embodiment of the plugged honeycomb structure of the present invention. FIG. 11A is a schematic view showing an enlarged part of the inflow side end surface of the further embodiment of the plugged honeycomb structure of the present invention. FIG. 11B is a schematic view showing an enlarged part of an outflow side end surface of the further embodiment of the plugged honeycomb structure of the present invention. Constitutions of the plugged honeycomb structures 200, 300 and 400 will be described later in detail.

Moreover, in the plugged honeycomb structure, a sum of areas of through channel portions of the inflow cells in the cross section perpendicular to the cell extending direction is preferably larger than a sum of areas of through channel portions of the outflow cells in the cross section perpendicular to the cell extending direction. According to such a constitution, a capacity of deposited ash can sufficiently be acquired. Furthermore, a pressure loss of the plugged honeycomb structure can be decreased. It is to be noted that the sum of the areas of the through channel portions of the inflow cells in the cross section perpendicular to the cell extending direction is further preferably from 1.2 to 2.4 times the sum of the areas of the through channel portions of the outflow cells in the cross section perpendicular to the cell extending direction. Here, "the areas of the through channel portions of the inflow cells in the cross section perpendicular to the cell extending direction" are areas of open portions of the inflow cells, when specific corner portions are not provided with reinforcing portions in the inflow cells. On the other hand, when the specific corner portions are provided with the reinforcing portions in the inflow cells, the area is an area of a substantially hollow portion which is obtained by subtracting an area of the reinforcing portion from the area of the open portion of the inflow cell. Similarly, "the areas of the through channel portions of the outflow cells in the cross section perpendicular to the cell extending direction" are areas of open portions of the outflow cells, when specific corner portions are not provided with reinforcing portions in the outflow cells. On the other hand, when the specific corner portions are provided with the reinforcing portions in the outflow cells, the area is an area of a substantially hollow portion which is obtained by subtracting an area of the reinforcing portion from the area of the open portion of the outflow cell.

In the plugged honeycomb structure 100 of the present embodiment, when the six corner portions 15 of the hexagonal cell 2 are constituted of "specific corner portions 15a" and "unspecific corner portions 15b" as described below, at least one of the specific corner portions 15a is provided with a reinforcing portion 6. With the result that the at least one specific corner portion 15a is provided with the reinforcing portion 6, a shape of the specific corner portion 15a provided with the reinforcing portion 6 is rounded. In the plugged honeycomb structure 100 of the present embodiment, the at least one specific corner portion 15a is provided with the reinforcing portion 6, and the unspecific corner portions 15b are not provided with the reinforcing portions 6. "The specific corner portion 15a" is the corner portion 15 between two sides which are the two partition walls 1 constituting the corner portion 15 and at least one of which is the partition wall 1 separating the inflow cells 2a or the outflow cells 2b from each other. "The unspecific corner portion 15b" is the corner portion 15 between two sides which are the two partition walls 1 constituting the corner portion 15 and each of which is the partition wall 1 separating the inflow cell 2a and the outflow cell 2b.

"The reinforcing portion" is a portion disposed in the corner portion where the two partition walls join with which the cell is formed, to increase a strength (a durability) of the partition walls which are solid portions of the honeycomb structure body. With the result that such a corner portion is provided, a shape of the specific corner portion is an R-shape. For example, "the reinforcing portion" may be constituted of a separate member (e.g., a reinforcing member such as a concave portion or a beam) separately disposed in the corner portion where the two partition walls join (e.g., the corner portion inherent in the hexagonal cell), to reinforce the corner portion. Moreover, "the reinforcing portion" may be obtained by forming a corner portion where the two partition walls join into a thick R-shape so that the corner portion is different from the corner portion inherent in the hexagonal cell. "The R-shape" is a rounded shape such as a circular or arc-like shape.

When the reinforcing portion is constituted of a separate member separately disposed to reinforce the corner portion, the predetermined corner portion can be provided with the reinforcing portion having any shape at the time of preparation of the honeycomb structure body. Therefore, variations of reinforced cells can be realized irrespective of a shape of a die for formation of the honeycomb structure body. On the other hand, when the reinforcing portion is constituted of the portion obtained by thickly forming the corner portion, the specific corner portion can easily be provided with the reinforcing portion at the time of manufacturing of the honeycomb structure body (more specifically, at the time of formation of a formed honeycomb body). Therefore, the plugged honeycomb structure of the present embodiment can remarkably easily be manufactured.

In the plugged honeycomb structure 100 having hexagonal cells 2, from the relations in shape and arrangement between the cells 2, the specific corner portions 15a" and the unspecific corner portions 15b" are present as described above. Here, in the plugged honeycomb structure 100, when an exhaust gas is passed as the fluid, the exhaust gas which has flowed into the inflow cells 2a of the inflow side end surface 11 permeates the partition walls 1 each separating the inflow cell 2a and the outflow cell 2b, to move to the outflow cells 2b. Then, during the permeation through the partition walls 1, the exhaust gas is purified, and discharged as the purified gas from the outflow side end surface 12. That is, in the plugged honeycomb structure 100, the movement (the permeation) of the fluid through the partition walls 1 occurs through the partition walls 1 each separating the inflow cell 2a and the outflow cell 2b. Therefore, the movement of the fluid through the partition walls 1 each separating the inflow cell 2a and the outflow cell 2b has a large influence on the pressure loss of the plugged honeycomb structure 100. In particular, when the exhaust gas which has flowed into the inflow cells from the inflow side end surface 11 is discharged as the purified gas from the outflow side end surface 12, the movement of the exhaust gas through the partition walls 1 each separating the inflow cell 2a and the outflow cell 2b is essentially required. On the other hand, in the partition walls 1 each separating the inflow cells 2a or the outflow cells 2b from each other, a differential pressure between the inflow cells 2a or the outflow cells 2b is hardly generated, and hence the movement (the permeation) of the fluid through the partition walls 1 scarcely occurs. Therefore, it can be considered that the movement of the fluid through the partition walls 1 each separating the inflow cells 2a or the outflow cells 2b from each other has a less influence on the pressure loss, as compared with the movement of the fluid through the partition walls 1 each separating the inflow cell 2a and the outflow cell 2b. It is to be noted that "the differential pressure between the inflow cells 2a" is a pressure difference of the fluid passing through the two inflow cells 2a adjacent to each other via the partition wall 1. Similarly, "the differential pressure between the outflow cells 2b" is a pressure difference of the fluid passing through the two outflow cells 2b adjacent to each other via the partition wall 1.

In the plugged honeycomb structure 100 of the present embodiment, the at least one specific corner portion 15a is provided with the reinforcing portion 6, which can enhance the isostatic strength of the plugged honeycomb structure 100. Furthermore, at least one of the two partition walls 1 constituting the specific corner portion 15a is "the partition wall 1 separating the inflow cells 2a or the outflow cells 2b from each other" which has little influence on the pressure loss. Therefore, even when the specific corner portion 15a is provided with the reinforcing portion 6, it is possible to suppress an increase in pressure loss and a decrease in capacity of the deposited ash, as compared with a case where the unspecific corner portion 15b is provided with the reinforcing portion 6. In the plugged honeycomb structure 100 of the present embodiment, it is possible to suppress an increase in initial pressure loss of the plugged honeycomb structure 100, and it is also possible to suppress the increase in pressure loss caused by the deposition of ash. "The initial pressure loss" is a pressure loss measured in a state where no particulate matter such as soot or ash is deposited on the partition walls of the plugged honeycomb structure. "The pressure loss caused by the deposition of ash" is a pressure loss measured in a state where ash is deposited on the partition walls of the plugged honeycomb structure.

The plugged honeycomb structure 100 shown in FIG. 2 shows an example where all the corner portions 15 corresponding to the specific corner portions 15a are provided with the reinforcing portions 6. A ratio of the number of the specific corner portions 15a provided with the reinforcing portions 6 to the number of the specific corner portions 15a is preferably 10% or more and 80% or less. It is to be noted that the above ratio is a percentage of the number of the specific corner portions 15a provided with the reinforcing portions 6 to the number of all the corner portions 15 corresponding to the specific corner portions 15a. According to such a constitution, the increase in pressure loss can effectively be suppressed. It is to be noted that the ratio of the number of the specific corner portions 15a provided with the reinforcing portions 6 to the number of the specific corner portions is further preferably 30% or more. When the ratio of the number of the specific corner portions 15a provided with the reinforcing portions 6 is in the above range, the isostatic strength of the plugged honeycomb structure 100 can effectively be enhanced. With the result that the ratio of the number of the specific corner portions 15a provided, with the reinforcing portions 6 is in the above range, it is possible to effectively suppress the increase in pressure loss and the decrease in capacity of the deposited ash.

When the specific corner portions 15a as part of all the specific corner portions 15a are provided with the reinforcing portions 6, there is not any special restriction on an arrangement pattern of the reinforcing portions. For example, each of the specific corner portions 15a may be regarded as a minimum unit, and all the specific corner portions 15a may regularly or irregularly be provided with the reinforcing portions 6. Moreover, the cell 2 having the specific corner portion 15a may be regarded as a minimum unit, and the cells 2 in which the specific corner portions 15a are provided with the reinforcing portions 6 may regularly be arranged.

Figure 12:
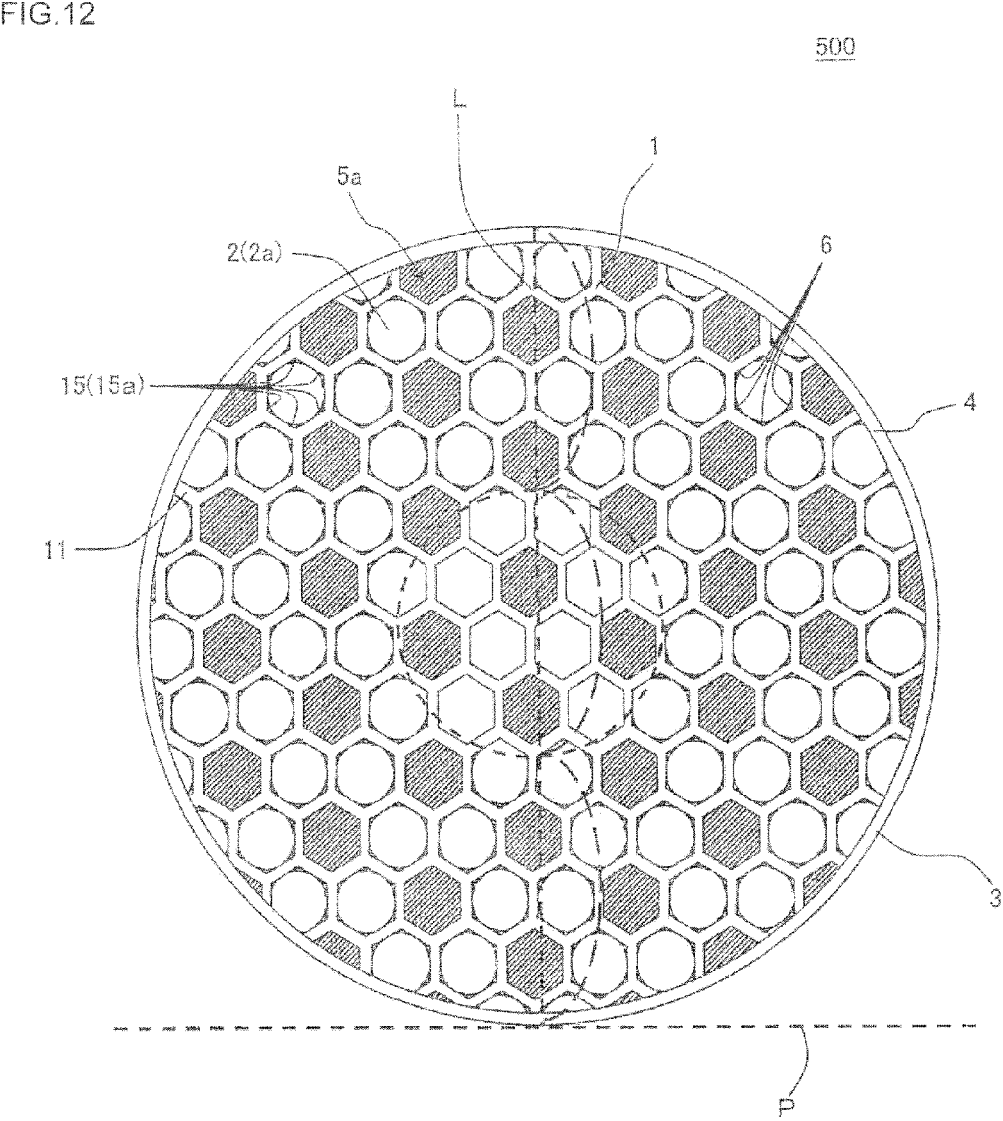
FIG. 12 is a plan view schematically showing an inflow side end surface of a still further embodiment of the plugged honeycomb structure of the present invention.

Moreover, as in a plugged honeycomb structure 500 shown in FIG. 12, in the cross section perpendicular to the extending direction of cells 2 of the honeycomb structure body 4, specific corner portions corresponding to 70% or more of the specific corner portions provided with reinforcing portion 6 are preferably positioned in an outer peripheral portion of a honeycomb structure body 4. FIG. 12 is a plan view schematically showing an inflow side end surface of a still further embodiment of the plugged honeycomb structure of the present invention. According to such a constitution, it is possible to suppress an increase in pressure loss caused by deposition of ash on the partition walls while effectively suppressing a decrease in capacity of the deposited ash. That is, when the ash is deposited on partition walls 1 of the plugged honeycomb structure 500, the ash is easily deposited on a central portion of the above cross section. Therefore, with the result that the specific corner portions corresponding to 70% or more of the specific corner portions provided with the reinforcing portions 6 are positioned in the outer peripheral portion of the honeycomb structure body 4, it is possible to suppress the decrease in capacity of the deposited ash. For example, in the plugged honeycomb structure 500, as compared with the plugged honeycomb structure in which the number of the arranged reinforcing portions 6 is the same but more reinforcing portions are arranged in the central portion, it is possible to suppress the decrease in capacity of the deposited ash, and it is possible to suppress the increase in pressure loss caused by the deposition of ash.

In the plugged honeycomb structure 500 shown in FIG. 12, all the specific corner portions provided with the reinforcing portions 6 are the specific corner portions positioned in the outer peripheral portion of the honeycomb structure body 4 in the cross section of the honeycomb structure body 4 which is perpendicular to the extending direction of the cells 2. "The outer peripheral portion" is a region of a length from an outer peripheral edge of the honeycomb structure body 4 in a normal direction of the outer peripheral edge which corresponds to the length of ⅓ or less of a length of a long axis L of the outer peripheral edge. The normal direction is a direction orthogonal to a tangent line P, when this tangent line (the tangent line F) is drawn to the outer peripheral edge of the honeycomb structure body 4 in the above cross section. In FIG. 12, the sectional shape of the honeycomb structure body 4 is a circle, and hence the long axis L is an axis extending in the normal direction of the outer peripheral edge.

Moreover, the specific corner portion 15a to be provided with the reinforcing portion 6 may be the specific corner portion 15a of the inflow cell 2a or the specific corner portion 15a of the outflow cell 2b. The plugged honeycomb structure 100 shown in FIG. 4A to FIG. 4C is an example where the specific corner portions 15a of the inflow cells 2a are provided with the reinforcing portions 6. In the plugged honeycomb structure of the present embodiment, it is preferable that the only specific corner portions 15a of the outflow cells 2b are provided with the reinforcing portions 6. According to such a constitution, in the inflow cells 2a, the specific corner portions 15a are not provided with the reinforcing portions 6, and hence it is possible to more effectively suppress the increase in pressure loss and the decrease in capacity of the deposited ash. It is to be noted that the plugged honeycomb structure in which the only specific corner portions 15a of the outflow cells 2b are provided with the reinforcing portions 6" is a plugged honeycomb structure having a constitution in which the inflow side end surface 11 and the outflow side end surface 12 in the plugged honeycomb structure 100 shown in FIG. 1 are inverted.

The two partition walls constituting the specific corner portion have two patterns in accordance with an arrangement state of the inflow side plugged portions and the outflow side plugged portions as follows. In the first pattern, one of the two partition walls constituting the specific corner portion is "the partition wall separating the inflow cells or the outflow cells from each other", and the other partition wall is "the partition wall separating the inflow cell and the outflow cell". An example of the plugged honeycomb structure of this first pattern is the plugged honeycomb structure 100 shown in FIG. 1. In the second pattern, both the two partition walls constituting the specific corner portion are "the partition walls each separating the inflow cells or the outflow cells from each other". An example of the plugged honeycomb structure of the second pattern is the plugged honeycomb structure 300 shown in FIG. 8, FIG. 9A, and FIG. 9B.

In the plugged honeycomb structure of the present embodiment, a ratio of a total area covered by the reinforcing portions in the cross section perpendicular to the cell extending direction to a sum of areas of all the cells in the cross section perpendicular to the cell extending direction is preferably 20% or less. According to such a constitution, it is possible to suppress excessive closing of the portions of the cells by the reinforcing portions, and suppress the increase in pressure loss of the plugged honeycomb structure. It is to be noted that "the ratio of the total area covered by the reinforcing portions in the cross section perpendicular to the cell extending direction to the sum of the areas of all the cells in the cross section perpendicular to the cell extending direction" will simply be referred to as "the ratio of the total area covered by the reinforcing portions". Moreover, "the areas of the cells in the cross section perpendicular to the cell extending direction" are the areas of the open portions of the hexagonal cells in a state where the corner portions are not provided with the reinforcing portions. The ratio of the total area covered by the reinforcing portions is further preferably 15% or less, and especially preferably 10% or less. Furthermore, from the viewpoint of enhancing the isostatic strength of the plugged honeycomb structure, the ratio of the total area covered by the reinforcing portions is preferably or more, and further preferably 5% or more.

In the plugged honeycomb structure 100 of the present embodiment, there is not any special restriction on a shape of the honeycomb structure body 4, but examples of the preferable shape include a cylindrical shape, a tubular shape with elliptic end surfaces, and pillar-like or prismatic shapes with end surfaces having polygonal shapes such as "a square shape, a rectangular shape, a triangular shape, a pentangular shape, a hexagonal shape and an octagonal shape". The honeycomb structure body 4 shown in FIG. 1, FIG. 2, FIG. 3A and FIG. 3B shows an example of the cylindrical shape. Moreover, the honeycomb structure body 4 has an outer peripheral wall 3, but does not necessarily have the outer peripheral wall 3. The outer peripheral wall 3 is preferably formed together with the partition walls during extrusion forming of the formed honeycomb body in a process of preparing the honeycomb structure body. Moreover, the outer peripheral wall 3 may be formed by coating the outer periphery of the honeycomb structure body with a ceramic material.

"The inflow cells" are cells including the outflow side plugged portions arranged in the open frontal areas of the cells at the outflow side end surface. A fluid such as the exhaust gas flows into the open frontal areas of the inflow cells from the inflow side end surface. On the other hand, "the outflow cells" are cells including the inflow side plugged portions arranged in the open frontal areas of the cells at the inflow side end surface. A fluid such as the exhaust gas cannot directly flow into the outflow cells, but the fluid which has flowed into the inflow cells passes through the partition walls to flow into the outflow cells, and is discharged from the open frontal areas of the outflow cells at the outflow side end surface. When the fluid moves from the inflow cells to the outflow cells, for example, the PM and the like in the fluid are collected by the porous partition walls.

There is not any special restriction on arrangement of the inflow cells and the outflow cells, i.e., arrangement of the outflow side plugged portions and inflow side plugged portions. For example, FIG. 1 shows an example where in one end surface (the inflow side end surface 11) of the honeycomb structure body 4, the inflow side plugged portions 5a and the outflow side plugged portions 5b are arranged so that six cells 2 adjacent to one outflow cell 2b via one partition wall 1 are the inflow cells 2a for the one outflow cell 2b. It is to be noted that in the plugged honeycomb structure 100 shown in FIG. 1, six cells 2 adjacent to one inflow cell 2a via one partition wall 1 have a constitution in which three inflow cells 2a and three outflow cells 2b are alternately arranged.

Figure 7B:
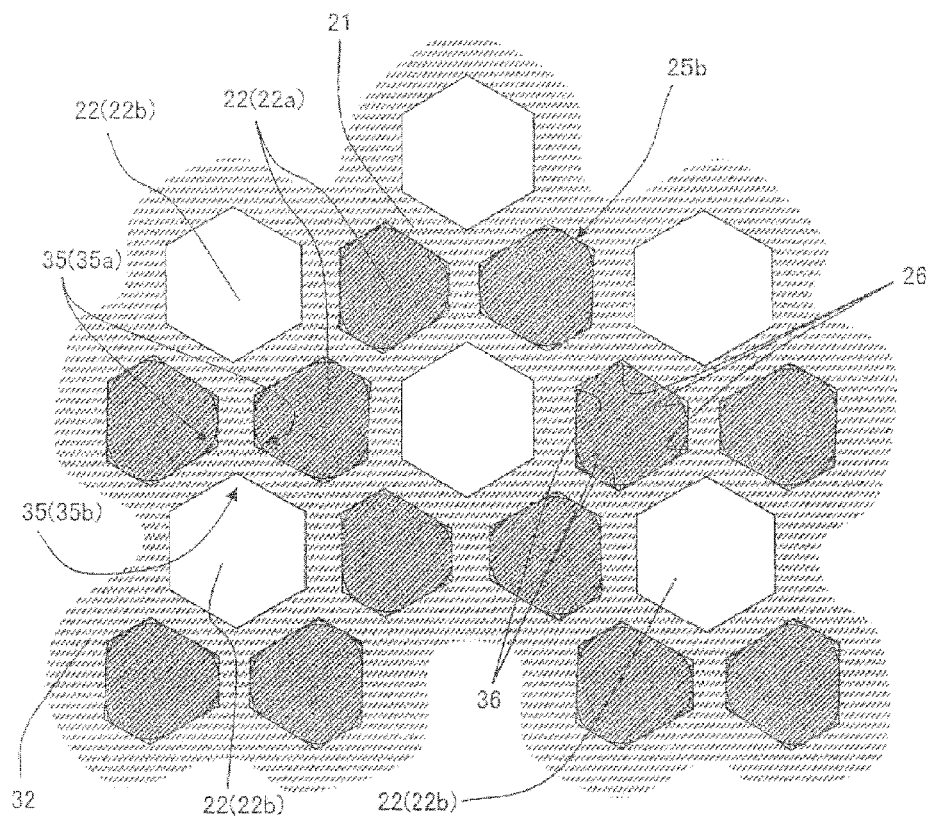
FIG. 7B is a schematic view showing an enlarged part of an outflow side end surface of the another embodiment of the plugged honeycomb structure of the present invention.

Also in the plugged honeycomb structure 200 shown in FIG. 6, FIG. 7A and FIG. 7B, an arrangement pattern of outflow side plugged portions 25b and inflow side plugged portions 25a is the same pattern as in the plugged honeycomb structure 100 shown in FIG. 1. That is, the inflow side plugged portions 25a and the outflow side plugged portions 25b are arranged so that six cells 22 adjacent to one outflow cell 22b via one partition wall 21 are inflow cells 22a for the one outflow cell 22b. Moreover, six cells 22 adjacent to one inflow cell 22a via one partition wall 21 have a constitution in which three inflow cells 22a and three outflow cells 22b are alternately arranged. Additionally, in the plugged honeycomb structure 200, a shape of the outflow cells 22b is a substantially regular hexagonal shape, but a shape of the inflow cells 22a is not a regular hexagonal shape. In the inflow cell 22a, among six sides of the hexagonal shape, a length of the side adjacent to the outflow cell 22b via the partition wall 21 is larger than a length of the side adjacent to the inflow cell 22a via the partition wall 21. Consequently, the plugged honeycomb structure 200 has a constitution in which "the length of the side which is the partition wall 21 separating the inflow cell 22a and the outflow cell 22b" is larger than "the length of the side which is the partition wall 21 separating the inflow cells 22a from each other". Therefore, the fluid advantageously moves from the inflow cells 22a to the outflow cells 22b, and a pressure loss of the plugged honeycomb structure 200 can be decreased. In the plugged honeycomb structure 200 shown in FIG. 6, FIG. 7A and FIG. 7B, among corner portions 35 of the hexagonal cell 22, a specific corner portion 35a is provided with a reinforcing portion 26, and an unspecific corner portion 35b is not provided with the reinforcing portion 26. It is to be noted that reference numeral 24 denotes a honeycomb structure body, and reference numeral 23 denotes an outer peripheral wall. Moreover, reference numeral 31 denotes an inflow side end surface, and reference numeral 32 denotes an outflow side end surface.

Moreover, in the plugged honeycomb structure 300 shown in FIG. 8, FIG. 9A and FIG. 9B, inflow side plugged portions 45a and outflow side plugged portions 45b are arranged so that six cells 42 adjacent to one inflow cell 42a via one partition wall 41 are outflow cells 42b for the one inflow cell 42a. Furthermore, in the plugged honeycomb structure 300, six cells 42 adjacent to the outflow cell 42b via one partition wall 41 are constituted of two inflow cells 42a and four outflow cells 42b. It is to be noted that in the plugged honeycomb structure 300, a shape of the inflow cells 42a is a substantially regular hexagonal shape, whereas a shape of the outflow cells 42b is not a regular hexagonal shape. The outflow cell 42b has a constitution in which, among six sides of the hexagonal shape, a length of each of four sides is smaller than a length of each of a pair of sides arranged to face each other. That is, this hexagonal shape is a flat hexagonal shape having a constitution in which the above-mentioned "length of each of the four remaining sides" is the same. Moreover, two relatively long sides among the six sides of the hexagonal shape are sides which are the partition walls 41 each separating an inflow cell 42a and an outflow cell 42b. Therefore, a fluid advantageously moves from the inflow cells 42a to the outflow cells 42b, and a pressure loss of the plugged honeycomb structure 300 can be decreased.

Also in the plugged honeycomb structure 300 shown in FIG. 8, FIG. 9A and FIG. 9B, among corner portions 55 of the hexagonal cell 42, a specific corner portion 55a is provided with a reinforcing portion 46, and an unspecific corner portion 55b is not provided with the reinforcing portion 46. It is to be noted that in the plugged honeycomb structure 300, among the specific corner portions 55a, only a first specific corner portion 55aa between two sides which are the partition walls 41 each separating the outflow cells 42b from each other is provided with the reinforcing portion 46. Hereinafter, among the specific corner portions, the specific corner portion between two sides which are the partition walls each separating the inflow cells or the outflow cells from each other will be referred to as "the first specific corner portion" sometimes. Moreover, among the specific corner portions, the specific corner portion between one side which is the partition wall separating the inflow cells or the outflow cells from each other and the other side that is the partition wall separating the inflow cell and the outflow cell will be referred to as "a second specific corner portion" sometimes. In the plugged honeycomb structure 300, a second specific corner portion 55ab is not provided with the reinforcing portion 46. It is to be noted that reference numeral 44 denotes a honeycomb structure body, and reference numeral 43 denotes an outer peripheral wall. Moreover, reference numeral 51 denotes an inflow side end surface, and reference numeral 52 denotes an outflow side end surface.

Moreover, in the plugged honeycomb structure 400 shown in FIG. 10, FIG. 11A and FIG. 11B, directions of an inflow side end surface 71 and an outflow side end surface 72 are inverse to those of the plugged honeycomb structure 300 shown in FIG. 8. Furthermore, except for the above constitution, the plugged honeycomb structure 400 has a constitution similar to the plugged honeycomb structure 300 shown in FIG. 8. That is, inflow side plugged portions 65a and outflow side plugged portions 65b are arranged so that six cells 62 adjacent to one outflow cell 62b via one partition wall 61 are inflow cells 62a for the one outflow cell 62b. Furthermore, in the plugged honeycomb structure 400, six cells 62 adjacent to the inflow cell 62a via one partition wall 61 are constituted of four inflow cells 62a and two outflow cells 62b. In the inflow cell 62a, among the six sides of a hexagonal shape, a length of each of four sides is smaller than a length of each of a pair of sides arranged to face each other.

Also in the plugged honeycomb structure 400 shown in FIG. 10, FIG. 11A and FIG. 11B, among corner portions 75 of the hexagonal cell 62, a specific corner portion 75a is provided with a reinforcing portion 66, and an unspecific corner portion 75b is not provided with the reinforcing portion 66. It is to be noted that in the plugged honeycomb structure 400, among the specific corner portions 75a, an only first specific corner portion 75aa is provided with the reinforcing portion 66, and a second specific corner portion 75ab is not provided with the reinforcing portion 66. It is to be noted that reference numeral 64 denotes a honeycomb structure body, and reference numeral 63 denotes an outer peripheral wall. Moreover, reference numeral 71 denotes an inflow side end surface, and reference numeral 72 denotes an outflow side end surface.

In the plugged honeycomb structure of the present embodiment, a thickness of each of the partition walls constituting the honeycomb structure body in the cross section perpendicular to the cell extending direction (hereinafter referred to simply as "the thickness of the partition wall" sometimes) is preferably basically uniform. "Basically uniform" means that the thicknesses of the partition walls are uniform except for a case where a small difference in thickness between the partition walls is made due to deformation during the formation, or the like. That is, in the plugged honeycomb structure of the present embodiment, any differences in thickness between the partition walls are not intentionally made, and the thicknesses of the partition walls are uniform in the above cross section. For example, when a slit of a die (a mold) for extrusion forming of the honeycomb structure body is manufactured by slicer processing, the above partition walls having the uniform thickness are realized. Moreover, in the plugged honeycomb structure of the present embodiment, when a portion (especially, a corner portion) of the partition wall which originally has the uniform thickness is formed to be thicker than the other portions, the portion is provided with the reinforcing portion.

The thickness of the partition wall is preferably from 80 to 500 μm, further preferably from 150 to 380 μm and especially preferably from 200 to 300 μm. When the thickness is smaller than 80 μm, the isostatic strength of the plugged honeycomb structure deteriorates sometimes. When the thickness is larger than 500 μm, the initial pressure loss of the plugged honeycomb structure increases sometimes.

A porosity of the partition wall is preferably from 40 to 80%, further preferably from 45 to 70%, and especially preferably from 50 to 65%. When the porosity is smaller than 40%, the initial pressure loss of the plugged honeycomb structure increases sometimes. When the porosity is larger than 80%, the strength of the plugged honeycomb structure deteriorates sometimes. The porosity is a value measured by a mercury porosimeter.

An average pore diameter of the partition walls is preferably from 5 to 40 μm, further preferably from 7 to 35 m, and especially preferably from 10 to 30 μl. When the average pore diameter is smaller than 5 μm, the initial pressure loss of the plugged honeycomb structure increases sometimes. When the average pore diameter is larger than 40 μm, the isostatic strength of the plugged honeycomb structure deteriorates sometimes. The average pore diameter is a value measured by the mercury porosimeter.

There is not any special restriction on a cell density of the honeycomb structure body, however, the cell density is preferably from 15.5 to 93.0 cells/cm$^2$, and further preferably from 23.3 to 62.0 cells/cm$^2$. When the cell density is smaller than 15.5 cells/cm$^2$, the isostatic strength of the plugged honeycomb structure deteriorates sometimes. When the cell density is larger than 93.0 cells/cm$^2$, a sectional area of each of the cells (an area of the cross section orthogonal to the cell extending direction) decreases, and hence the pressure loss increases sometimes.

A material of the partition walls is preferably a ceramic material. Because of excellent strength and heat resisting properties, the material of the partition walls is further preferably at least one selected from the group consisting of cordierite, silicon carbide, a silicon-silicon carbide composite material, mullite, alumina, aluminum titanate, silicon nitride, and a silicon carbide-cordierite composite material. Among these materials, cordierite is especially preferable.

There is not any special restriction on a material of the reinforcing portions, however a ceramic material is preferable. As the material of the reinforcing portions, the above preferable example of the material of the partition walls can suitably be used. More preferably, in the plugged honeycomb structure of the present embodiment, a thermal expansion coefficient of the partition wall and a thermal expansion coefficient of the reinforcing portion have the same value or values close to each other. Furthermore, more preferably, the material of the partition walls and the material of the reinforcing portions are the same. According to such a constitution, even when a heat stress is applied to the plugged honeycomb structure, the reinforcing portions can be prevented from being peeled from the honeycomb structure body, and a bonding portion between the reinforcing portion and the partition wall can be prevented from being damaged. It is to be noted that when the partition walls and the reinforcing portions are integrally formed, the material of the reinforcing portions is the same material as that of the partition walls.

Moreover, the reinforcing portion, in at least one specific corner portion, is preferably formed along the whole region from the inflow side end surface to the outflow side end surface of the honeycomb structure body. According to such a constitution, a durability of the whole plugged honeycomb structure in the cell extending direction can suitably be enhanced.

At least one of a surface of the partition wall and an inner wall of a pore formed in the partition wall of the above honeycomb structure body may be coated with catalyst. Examples of catalyst include an oxidation catalyst, an NO adsorber catalyst, and an SCR catalyst.

An example of the oxidation catalyst is a noble metal such as platinum. An example of the NO adsorber catalyst is an alkali earth metal. An example of the SCR catalyst is zeolite. Moreover, other than the above-mentioned catalysts, a catalyst type suitable for oxidation of a harmful component, soot or the like or purification of NO in the exhaust gas can preferably be selected.

(2) Manufacturing Method of Plugged Honeycomb Structure:

A manufacturing method of the plugged honeycomb structure of the present embodiment will be described. First, a kneaded material for preparation of the honeycomb structure body is prepared, and this kneaded material is formed to prepare a formed honeycomb body (forming step). At this formation, at least one corner portion that becomes the specific corner portion in the plugged honeycomb structure to be obtained is preferably provided with the reinforcing portion, to obtain a reinforced formed honeycomb body. Moreover, at the formation, the corner portion that becomes the specific corner portion may not be provided with the reinforcing portion, but one of the formed honeycomb body, a dried honeycomb body obtained by drying the formed honeycomb body and the honeycomb structure body obtained by firing the dried honeycomb body can be provided with the reinforcing portion. A specific method will be described in more detail in each step described later.

Moreover, before the formed honeycomb body is manufactured, the inflow side end surface and the outflow side end surface are preferably determined for use as the plugged honeycomb structure. That is, in the plugged honeycomb structure of the present embodiment, the specific corner portions and the unspecific corner portions are determined in accordance with the arrangement of the inflow cells and the outflow cells. Therefore, a directionality of the pillar-like or prismatic formed honeycomb body is preferably determined in advance. Furthermore, before the formed honeycomb body is manufactured, the cells to be provided with the inflow side plugged portions and the cells to be provided with the outflow side plugged portions are preferably specified.

Next, the obtained formed honeycomb body (or the dried honeycomb body subjected to drying performed as required) is fired to prepare the honeycomb structure body (honeycomb structure body preparing step). In case the reinforcing portions are not formed during the formation, at least one corner portion that becomes the specific corner portion is provided with the reinforcing portion before or after the firing.

Next, the open frontal areas of the predetermined cells at the inflow side end surface of the formed honeycomb body and the open frontal areas of the remaining cells at the outflow side end surface are plugged, to form the inflow side plugged portions and the outflow side plugged portions (plugging step). In this way, the plugged honeycomb structure of the present embodiment can be manufactured. Hereinafter, each manufacturing step will be described in more detail.

(2-1) Forming Step:

First, in the forming step, a ceramic forming raw material containing a ceramic raw material is formed, to obtain the formed honeycomb body in which the plurality of cells are formed to define the through channels of the An example of the ceramic raw material contained in the ceramic forming raw material is preferably a material containing at least one selected from the group consisting of a cordierite forming raw material, cordierite, mullite, alumina, titania, silicon carbide, and aluminum titanate. Furthermore, the ceramic raw material is further preferably at least one selected from the above group, and especially preferably one selected from the above group. It is to be noted that the cordierite forming raw material is a ceramic raw material blended so as to obtain a chemical composition which falls in ranges of 42 to 56 mass % of silica, 30 to 45 mass % of alumina, and 12 to 16 mass % of magnesia. The cordierite forming raw material is fired to become cordierite.

Moreover, this ceramic forming raw material is preferably prepared by mixing the above ceramic raw material with a dispersion medium, an organic binder, an inorganic binder, a pore former, a surfactant and the like. There is not any special restriction on a composition ratio of each raw material, and the composition ratio is preferably determined in accordance with a structure, a material and the like of the honeycomb structure body to be prepared.

In the formation of the ceramic forming raw material, it is preferable that the forming raw material is first kneaded to obtain the kneaded material and that the obtained kneaded material is formed into a honeycomb shape. There is not any special restriction on a method of kneading the forming raw material to form the kneaded material, and an example of the method is a method using a kneader, a vacuum clay kneader or the like. There is not any special restriction on a method of forming the kneaded material to obtain the formed honeycomb body, and a heretofore known forming method such as extrusion forming or injection forming can be used. An example of the method is preferably a method of performing the extrusion forming by use of a die having a desirable cell shape, partition wall thickness and cell density to obtain the formed honeycomb body. A material of the die is preferably a hard metal which does not easily wear out.

During this formation, at least one corner portion that becomes the specific corner portion among six corner portions of each of the hexagonal cells in the plugged honeycomb structure to be obtained may be provided with the reinforcing portion, to obtain a reinforced formed honeycomb body which has been reinforced. For example, it is preferable to use a die for the formation of the honeycomb structure body which has such a slit shape that the cells each having the specific corner portion provided with the reinforcing portion and the cells each having the unspecific corner portion which is not provided with the reinforcing portion can selectively be formed.

An example of the die is a die constituted of a die base material having two surfaces. One of the surfaces is provided with hexagonal lattice-like slits, and the other surface is provided with back pores communicating with the above slits to introduce the forming raw material. Among intersections of this die where the slits cross, a vertex of at least one corner portion that becomes the specific corner portion in the honeycomb structure body to be obtained is preferably formed into a curved shape. By use of such a die, desirable corner portions can selectively be provided with the reinforcing portions at the formation of the formed honeycomb body. Moreover, the slit intersection of the die may be provided with a concave portion or a beam so as to reinforce the at least one corner portion that becomes the specific corner portion.

There is not any special restriction on a shape of the formed honeycomb body, and examples of the shape include a cylindrical shape (a columnar shape), and a tubular shape (a pillar-like shape) in which a cross section orthogonal to a central axis has an elliptic shape, a race track shape, or a polygonal shape such as a triangular shape, a quadrangular shape, a pentangular shape, a hexagonal shape or an octagonal shape.

Moreover, after the above formation, the obtained formed honeycomb body may be dried. There is not any special restriction on a drying method, but examples of the method include hot air drying, microwave drying, dielectric drying, reduced pressure drying, vacuum drying, and freeze drying. Among these methods, the dielectric drying, the microwave drying or the hot air drying is preferably performed alone or in combination.

(2-2) Honeycomb Structure Body Preparing Step:

Next, the obtained formed honeycomb body is preferably fired to prepare the honeycomb structure body. It is to be noted that the firing of the formed honeycomb body may be performed after arranging the plugged portions in the formed honeycomb body.

Moreover, the formed honeycomb body is preferably calcinated prior to the firing (final firing) of the formed honeycomb body. The calcination is performed for the purpose of degreasing. There is not any special restriction on a calcinating method, as long as an organic substance (the organic binder, the dispersant, the pore former, etc.) in the formed honeycomb body can be removed. In general, a burning temperature of the organic binder is from about 100 to 300° C., and a burning temperature of the pore former is from about 200 to 800° C. Therefore, as calcinating conditions, it is preferable that heating is performed at about 200 to 1000° C. in an oxidation atmosphere for about three to 100 hours.

The firing (the final firing) of the formed honeycomb body is performed for the purpose of sintering and densifying the forming raw material constituting the calcinated formed body to acquire a predetermined strength. Firing conditions (temperature, time and atmosphere) vary in accordance with the type of the forming raw material, and hence suitable conditions may be selected in accordance with the type. For example, when the cordierite forming raw material is used, the firing temperature is preferably from 1410 to 1440° C. Moreover, the firing time, as time to keep the highest temperature, is preferably from four six hours.

Moreover, when the reinforcing portions are not formed at the formation of the formed honeycomb body, at least one corner portion that becomes the specific corner portion is preferably coated with a concave-like or beam-like reinforcing material to form the reinforcing portion before or after the firing. As a specific method of forming the reinforcing portion, for example, a dipping system can be used in which the honeycomb structure body before or after firing is immersed from an inflow side end surface side or an outflow side end surface side into the reinforcing material prepared in a slurry state in a certain container. In this case, the open frontal areas of the hexagonal cells including the unspecific corner portions may be masked to prevent the reinforcing material from flowing into these hexagonal cells. Moreover, the reinforcing portion can be formed, for example, by using a sucking system in which the outflow side end surface of the honeycomb structure body is brought into contact with a similar slurry-like reinforcing material, and from this state, the above reinforcing material is sucked from the inflow side end surface of the honeycomb structure body. Furthermore, the reinforcing portion can be formed by using an injection system in which a similar slurry-like reinforcing material is injected from the outflow side end surface of the honeycomb structure body. Moreover, to avoid a damage to the reinforcing material or the honeycomb structure body in actual use, the thermal expansion coefficient of the reinforcing material is preferably regulated to be equivalent to the thermal expansion coefficient of the honeycomb structure body. In consequence, it is possible to obtain the honeycomb structure body in which at least one corner portion that becomes the specific corner portion is provided with the reinforcing portion. Moreover, the above-mentioned step of forming the reinforcing portion may be performed after the plugging step.

(2-3) Plugging Step:

Next, in the honeycomb structure body, the open frontal areas of the outflow cells at the inflow side end surface are charged with a plugging material, to form the inflow side plugged portions. Moreover, the open frontal areas of the inflow cells at the outflow side end surface of the honeycomb structure body are charged with the plugging material, to form the outflow side plugged portions. An order of charging the inflow side end surface and the outflow side end surface with the plugging material may be inverse. Furthermore, when the at least one corner portion that becomes the specific corner portion is provided with the reinforcing portion prior to this plugging step, the honeycomb structure body is charged with the plugging material so that at least one of two partition walls constituting the corner portion provided with the reinforcing portion becomes the partition wall separating the inflow cells or the outflow cells from each other.

An example of a method of charging the open frontal areas of the outflow cells at the inflow side end surface with the plugging material is a method having the following "masking step" and "press-in step". "The masking step" is a step of attaching a sheet to the inflow side end surface of the honeycomb structure body and making holes at positions which overlap with "the cells to be provided with the plugged portions" in the sheet. "The press-in step" is a step of pressing "the end portion of the honeycomb structure body to which the sheet has been attached" into a container containing the plugging material, to press the plugging material into the cells of the honeycomb structure body. By this press-in step, the plugging material passes through the holes made in the sheet so that the only cells communicating with the holes made in the sheet are charged.

Moreover, a method of charging the open frontal areas of the inflow cells at the outflow side end surface of the honeycomb structure body with the plugging material is preferably a method similar to the above "method of charging the open frontal areas of the outflow cells at the inflow side end surface with the plugging material". Furthermore, both the end portions of the honeycomb structure body may simultaneously be charged with the plugging material.

Next, the plugging material with which the honeycomb structure body has been charged is preferably dried to form the plugged portions, thereby obtaining the plugged honeycomb structure. The plugging material may be dried after charging both the end portions of the honeycomb structure body with the plugging material. Moreover, the other end portion (e.g., the outflow side end surface) may be charged with the plugging material, and then the plugging material with which the other end portion has been charged may be dried after drying the plugging material with which the one end portion (e.g., the inflow side end surface) of the honeycomb structure body has been charged. Furthermore, the plugging material may be fired for the purpose of more securely fixing the material. Additionally, the formed honeycomb body before or after the drying may be charged with the plugging material, and the plugging material may be fired together with the formed honeycomb body before or after the drying.

According to such a constitution, the plugged honeycomb structure of the present embodiment can be manufactured. However, the manufacturing method of the plugged honeycomb structure of the present embodiment is not limited to the above-mentioned manufacturing method. That is, the manufacturing method may be any method capable of manufacturing the plugged honeycomb structure in which at least one corner portion that becomes the specific corner portion among the six corner portions of each hexagonal cell is provided with the reinforcing portion so that the shape of the specific corner portion is rounded and in which the unspecific corner portions are not provided with the reinforcing portions.

EXAMPLES

Hereinafter, examples of the plugged honeycomb structure of the present invention will further specifically be described, but the present invention is not limited to these examples.

Example 1

As a ceramic raw material, a cordierite forming raw material (alumina, talc and kaolin) was used. A mass ratio of alumina, talc and kaolin was a mass ratio at which cordierite was obtained after firing. The ceramic raw material was mixed with a binder (methylcellulose) and water, to obtain a ceramic forming raw material. The obtained ceramic forming raw material was kneaded by using a kneader to obtain a kneaded material.

Next, the obtained kneaded material was formed by using a vacuum extrusion forming machine, to obtain a formed honeycomb body including partition walls with which hexagonal cells were formed. For the hexagonal cells, as in a plugged honeycomb structure 100 shown in FIG. 1, FIG. 2, FIG. 3A, FIG. 3B, and FIG. 4A to FIG. 4C, all hexagonal cells 2 had the same shape. In this formed honeycomb body, all corner portions to become specific corner portions were provided with reinforcing portions 6 at formation. This is indicated as "all the specific corner portions" in the column of "arrangement of the reinforcing portions" of Table 1.

Next, open frontal areas of the cells to become outflow cells at an inflow side end surface of the formed honeycomb body were masked. Then, an end portion of the formed honeycomb body on an inflow side end surface side was immersed into a plugging slurry containing a cordierite forming raw material, to charge, with the plugging slurry, the open frontal areas of the cells which would become the outflow cells. Moreover, open frontal areas of the cells to become inflow cells at an outflow side end surface of the formed honeycomb body were masked. Then, an end portion of the formed honeycomb body on an outflow side end surface side was immersed into the plugging slurry containing the cordierite forming material, to charge, with the plugging slurry, the open frontal areas of the cells which would become the inflow cells. In consequence, a plugged formed honeycomb body was obtained in which plugged portions were arranged in the open frontal areas of the outflow cells at the inflow side end surface and the open frontal areas of the inflow cells at the outflow side end surface.

Next, the plugged formed honeycomb body was heated at 450° C. for five hours to perform degreasing, and further heated at 1425° C. for seven hours to perform firing, thereby obtaining a plugged honeycomb structure.

A partition wall thickness of the obtained plugged honeycomb structure was 0.3 mm, and a cell density was 47.2 cells/cm$^2$. The whole shape of the honeycomb structure body was a cylindrical shape, a diameter of an end surface of the honeycomb structure body was 143.8 mm, and a length in a cell extending direction was 152.4 mm.

Moreover, "an area ratio (%) covered by the reinforcing portions" in the plugged honeycomb structure of the example was 5%. The area ratio (%) covered by the reinforcing portions indicates a ratio of the area covered by the reinforcing portions to an area of one cell. It is to be noted that when the area covered by the reinforcing portions is an integrated value of the areas covered by the respective reinforcing portions, when the six corner portions of the hexagonal cell is provided with two or more reinforcing portions,

TABLE 1

|  | Area ratio (%) covered by reinforcing portions | Arrangement of reinforcing portions | Isostatic strength | Initial pressure loss | Capacity of deposited ash | Pressure loss at ash deposition |
| --- | --- | --- | --- | --- | --- | --- |
| Comparative Example 1 | — | None | Reference | Reference | Reference | Reference |
| Comparative Example 2 | 5% | All corner portions | A | C | B | C |
| Comparative Example 3 | 5% | All unspecific corner portion | A | C | B | C |
| Example 1 | 5% | All specific corner portions | A | B | B | B |
| Example 2 | 5% | 80% of specific corner portions | A | A | A | B |
| Example 3 | 5% | 50% of specific corner portions | A | A | A | A |

TABLE 1-continued

| | Area ratio (%) covered by reinforcing portions | Arrangement of reinforcing portions | Isostatic strength | Initial pressure loss | Capacity of deposited ash | Pressure loss at ash deposition |
|---|---|---|---|---|---|---|
| Example 4 | 5% | 30% of specific corner portions | A | A | A | A |
| Example 5 | 5% | 10% of specific corner portions | B | A | A | A |
| Example 6 | 10% | 30% of specific corner portions | A | A | B | B |
| Example 7 | 20% | 30% of specific corner portions | A | B | B | B |
| Example 8 | 5% | 30% of specific corner portions (outer peripheral portion) | A | A | A | AA |
| Example 9 | 5% | 50% of specific corner portions (outer peripheral portion) | A | A | A | AA |
| Example 10 | 10% | 30% of specific corner portions (outer peripheral portion) | A | A | A | A |

The obtained plugged honeycomb structure was subjected to evaluation of "an isostatic strength", "an initial pressure loss", "a capacity of deposited ash", and "a pressure loss at the ash deposition" by the following methods. The evaluation results are shown in Table 1.

[Isostatic Strength]

Measurement of the isostatic strength was carried out based on an isostatic breakdown strength test stipulated by M505-87 of automotive standard (JASO standard) issued by the Society of Automotive Engineers of Japan. In the isostatic breakdown strength test, the plugged honeycomb structure is contained in a rubber tubular container, the container is closed with an aluminum plate lid, and isotropic pressure compression is performed in water. That is, the isostatic breakdown strength test simulates compression loading in a case where an outer peripheral surface of the plugged honeycomb structure is held in a can member of a converter. The isostatic strength measured by this isostatic breakdown strength test is indicated by an applied pressure value (MPa) at breakdown of the plugged honeycomb structure. In Examples 1 to 10 and Comparative Examples 2 and 3, the evaluation was carried out based on the following evaluation criteria by use of the isostatic strength of the plugged honeycomb structure of Comparative Example 1 described later as a reference. In Examples 11 to 17 and Comparative Examples 5 and 6, the evaluation was carried out based on the following evaluation criteria by use of the isostatic strength of the plugged honeycomb structure of Comparative Example 4 described later as a reference. In Examples 18 to 26 and Comparative Example 8, the evaluation was carried out based on the following evaluation criteria by use of the isostatic strength of the plugged honeycomb structure of Comparative Example 7 described later as a reference. In Examples 27 to 35 and Comparative Example 10, the evaluation was carried out based on the following evaluation criteria by use of the isostatic strength of the plugged honeycomb structure of Comparative Example 9 described later as a reference.

[Evaluation Criteria of Isostatic Strength] A: a case where the isostatic strength of the plugged honeycomb structure as an evaluation object enhances as much as 30% or more from the isostatic strength of the plugged honeycomb structure of the reference. B: a case where the isostatic strength of the plugged honeycomb structure as the evaluation object enhances as much as 10% or more and less than 30% from the isostatic strength of the plugged honeycomb structure of the reference.

[Initial Pressure Loss]

An initial pressure loss is a pressure loss measured in a state where a particulate matter such as soot or ash is not deposited on the partition walls of the plugged honeycomb structure. Specifically, air at 200° C. was allowed to flow into the plugged honeycomb structure at a predetermined flow rate, pressures at the inflow side end surface and outflow side end surface of the plugged honeycomb structure were measured, and the differential pressure was obtained as the initial pressure loss. In Examples 1 to 10 and Comparative Examples 2 and 3, evaluation was carried out based on the following evaluation criteria by use of the initial pressure loss of the plugged honeycomb structure of Comparative Example 1 described later as a reference. In Examples 11 to 17 and Comparative Examples 5 and 6, the evaluation was carried out based on the following evaluation criteria by use of the initial pressure loss of the plugged honeycomb structure of Comparative Example 4 described later as a reference. In Examples 18 to 26 and Comparative Example 8, the evaluation was carried out based on the following evaluation criteria by use of the initial pressure loss of the plugged honeycomb structure of Comparative Example 7 described later as a reference. In Examples 27 to 35 and Comparative Example 10, the evaluation was carried out based on the following evaluation criteria by use of the initial pressure loss of the plugged honeycomb structure of Comparative Example 9 described later as a reference.

[Evaluation Criteria of Initial Pressure Loss] A: a case where a ratio of an increase in initial pressure loss of the plugged honeycomb structure as the evaluation object is 5% or more and less than 10%, as compared with the initial pressure loss of the plugged honeycomb structure of the reference. B: a case where the ratio of the increase in initial pressure loss of the plugged honeycomb structure as the evaluation object is 10% or more and less than 30%, as compared with the initial pressure loss of the plugged honeycomb structure of the reference. C: a case where the ratio of the increase in initial pressure loss of the plugged honeycomb structure as the evaluation object is 30% or more, as compared with the initial pressure loss of the plugged honeycomb structure of the reference.

In the above evaluation criteria of the initial pressure loss, evaluation of "A" is more suitable, evaluation of "E" is suitable, and evaluation of "C" is improper.

[Capacity of Deposited Ash]

The capacity of the deposited ash was obtained by multiplying a sum of areas of through channel portions of inflow cells by a length from one end surface to the other end surface of the honeycomb structure body. In Examples 1 to 10 and Comparative Examples 2 and 3, the evaluation was carried out based on the following evaluation criteria by use of the capacity of the deposited ash of the plugged honeycomb structure of Comparative Example 1 described later as a reference. In Examples 11 to 17 and Comparative Examples 5 and 6, the evaluation was carried out based on the following evaluation criteria by use of the capacity of the deposited ash of the plugged honeycomb structure of Comparative Example 4 described later as a reference. In Examples 18 to 26 and Comparative Example 8, the evaluation was carried out based on the following evaluation criteria by use of the capacity of the deposited ash of the plugged honeycomb structure of Comparative Example 7 described later as a reference. In Examples 27 to 35 and Comparative Example 10, the evaluation was carried out based on the following evaluation criteria by use of the capacity of the deposited ash of the plugged honeycomb structure of Comparative Example 9 described later as a reference.

[Evaluation Criteria of Capacity of Deposited Ash] A: a case where a ratio of a decrease in capacity of the deposited ash of the plugged honeycomb structure as the evaluation object is smaller than 10%, as compared with the capacity of the deposited ash of the plugged honeycomb structure of the reference. B: a case where the ratio of the decrease in capacity of the deposited ash of the plugged honeycomb structure as the evaluation object is 10% or more and less than 30%, as compared with the capacity of the deposited ash of the plugged honeycomb structure of the reference. C: a case where the ratio of the decrease in capacity of the deposited ash of the plugged honeycomb structure as the evaluation object is 30% or more, as compared with the capacity of the deposited ash of the plugged honeycomb structure of the reference.

In the above evaluation criteria of the capacity of the deposited ash, evaluation of "A" is more suitable, evaluation of "B" is suitable, and evaluation of "C" is improper.

[Pressure Loss at Ash Deposition]

A pressure loss at ash deposition is a pressure loss measured in a state where a gas including ash is passed through the plugged honeycomb structure and the ash is deposited on the surfaces of the partition walls of the plugged honeycomb structure. Specifically, in a cross section where a length from the inflow side end surface of the plugged honeycomb structure is a length of ⅓ of the whole length of the plugged honeycomb structure, the pressure loss in a state where the ash is deposited on a central portion of the cross section is measured. For the pressure loss, pressures at the inflow side end surface and outflow side end surface of the plugged honeycomb structure were measured, and the differential pressure was obtained as the pressure loss. "The whole length of the plugged honeycomb structure" is a length from the inflow side end surface to the outflow side end surface of the honeycomb structure body. In Examples 1 to 10 and Comparative Examples 2 and 3, evaluation was carried out based on the following evaluation criteria by use of the pressure loss at the ash deposition of the plugged honeycomb structure of Comparative Example 1 described later as a reference. In Examples 11 to 17 and Comparative Examples 5 and 6, the evaluation was carried out based on the following evaluation criteria by use of the pressure loss at the ash deposition of the plugged honeycomb structure of Comparative Example 4 described later as a reference. In Examples 18 to 26 and Comparative Example 8, the evaluation was carried out based on the following evaluation criteria by use of the pressure loss at the ash deposition of the plugged honeycomb structure of Comparative Example 7 described later as a reference. In Examples 27 to 35 and Comparative Example 10, the evaluation was carried out based on the following evaluation criteria by use of the pressure loss at the ash deposition of the plugged honeycomb structure of Comparative Example 9 described later as a reference.

[Evaluation Criteria of Pressure Loss at Ash Deposition]
AA: a case where a ratio of an increase in pressure loss at the ash deposition of the plugged honeycomb structure as the evaluation object is smaller than 5%, as compared with the pressure loss at the ash deposition of the plugged honeycomb structure of the reference. A: a case where the ratio of the increase in pressure loss at the ash deposition of the plugged honeycomb structure as the evaluation object is 5% or more and less than 10%, as compared with the pressure loss at the ash deposition of the plugged honeycomb structure of the reference. B: a case where the ratio of the increase in pressure loss at the ash deposition of the plugged honeycomb structure as the evaluation object is 10% or more and less than 30%, as compared with the pressure loss at the ash deposition of the plugged honeycomb structure of the reference. C: a case where the ratio of the increase in pressure loss at the ash deposition of the plugged honeycomb structure as the evaluation object is 30% or more, as compared with the pressure loss at the ash deposition of the plugged honeycomb structure of the reference In the above evaluation criteria of the pressure loss at the ash deposition, the evaluation of "AA" is especially suitable, evaluation of "A" is more suitable, evaluation of "B" is suitable, and evaluation of "C" is improper.

Examples 2 to 10

The procedures of Example 1 were repeated except that "an area ratio (%) covered by reinforcing portions" and "arrangement of the reinforcing portions" were changed as shown in Table 1, to manufacture plugged honeycomb structures. The obtained plugged honeycomb structures were subjected to evaluation of "an isostatic strength", "an initial pressure loss", "a capacity of deposited ash", and "a pressure loss at the ash deposition". The evaluation results are shown in Table 1. Additionally, in Example 2, specific corner portions corresponding to 80% of the specific corner portions of hexagonal cells were provided with reinforcing portions. In Example 3, specific corner portions corresponding to 50% of the specific corner portions of hexagonal cells were provided with reinforcing portions. In Example 3, when the specific corner portions were adjacently arranged to share one side constituting each of the hexagonal cells, the specific corner portions were provided with the reinforcing portions so that the specific corner portions provided with the reinforcing portions and the specific corner portions which were not provided with the reinforcing portions were alternately arranged. In Examples 4, 6 and 7, specific corner portions corresponding to 30% of the specific corner portions of hexagonal cells were provided with reinforcing portions. In Example 5, specific corner portions corresponding to 10% of the specific corner portions of hexagonal cells were provided with reinforcing portions. In Examples 8 to 10, among specific corner portions of hexagonal cells, the specific corner portions present in an outer peripheral portion of each honeycomb structure body were provided with reinforcing portions. Moreover, in Examples 8 and 9, specific corner portions corresponding to 30% of the specific corner portions of the hexagonal cells were provided with the reinforcing portions, and in Example 10, specific corner portions corresponding to 50% of the specific corner portions of the hexagonal cells were provided with the reinforcing portions.

Comparative Example 1

The procedures of Example 1 were repeated except that specific corner portions and unspecific corner portions were not provided with reinforcing portions, to manufacture a plugged honeycomb structure. The obtained plugged honeycomb structure was subjected to evaluation of "isostatic strength", "initial pressure loss", "capacity of deposited ash", and "pressure loss at the ash deposition". The evaluation results are shown in Table 1.

Comparative Example 2

The procedures of Example 1 were repeated except that all corner portions including specific corner portions and unspecific corner portions were provided with reinforcing portions, to manufacture a plugged honeycomb structure. The obtained plugged honeycomb structure was subjected to evaluation of "isostatic strength", "initial pressure loss", "capacity of deposited ash", and "pressure loss at the ash deposition". The evaluation results are shown in Table 1.

Comparative Example 3

The procedures of Example 1 were repeated except that all unspecific corner portions were provided with reinforcing portions and all specific corner portions were not provided with the reinforcing portions, to manufacture a plugged honeycomb structure. The obtained plugged honeycomb structure was subjected to evaluation of "isostatic strength", "initial pressure loss", "capacity of deposited ash", and "pressure loss at the ash deposition". The evaluation results are shown in Table 1.

Conclusion 1

As shown in Table 1, when the plugged honeycomb structure of Comparative Example 1 was used as the reference, in the plugged honeycomb structures of Examples 1 to 10, it was possible to enhance the isostatic strength, and it was possible to suppress an increase in initial pressure loss and a decrease in capacity of the deposited ash. Moreover, it has been confirmed that it was possible to suppress an increase in pressure loss at the ash deposition. On the other hand, in the plugged honeycomb structure of Comparative Example 2, the isostatic strength enhanced, but the initial pressure loss increased, and furthermore, the pressure loss at the ash deposition increased as much as 30% or more. Also when all the unspecific corner portions were provided with the reinforcing portions as in the plugged honeycomb structure of Comparative Example 3, the isostatic strength enhanced, but the initial pressure loss and the pressure loss at the ash deposition increased. Moreover, as seen from the results of Examples 4, 5 and 7, as the area ratio covered by the reinforcing portions increases, the initial pressure loss increases, and the capacity of the deposited ash decreases. Therefore, it is considered that to enhance the isostatic strength and to more suitably suppress the increase in initial pressure loss and the decrease in capacity of the deposited ash, an upper limit value of a preferable range of the area ratio covered by the reinforcing portions is about 25%. Moreover, it has been found that when the specific corner portions in the outer peripheral portion of the honeycomb structure body were provided with the reinforcing portions, an effect of suppressing the increase in pressure loss at the ash deposition enhanced.

Example 11

The procedures of Example 1 were repeated except that a hexagonal cell shape was formed as in a plugged honeycomb structure 200 shown in FIG. 6, FIG. 7A and FIG. 7E, to manufacture a plugged honeycomb structure. The obtained plugged honeycomb structure was subjected to evaluation of "isostatic strength", "initial pressure loss", "capacity of deposited ash", and "pressure loss at the ash deposition". The evaluation results are shown in Table 2. In the plugged honeycomb structure of Example 11, a shape of outflow cells was a regular hexagonal shape having one side of 0.85 mm. Moreover, in a shape of inflow cells, among six sides of a hexagonal shape, a length of each of three sides adjacent to the outflow cells via partition walls (i.e., long sides) was 0.85 mm, and a length of each of three sides adjacent to the inflow cells via partition walls (i.e., short sides) was 0.50 mm. In the plugged honeycomb structure of Example 11, all corner portions that became specific corner portions were provided with reinforcing portions. "An area ratio covered by the reinforcing portions" and "arrangement of the reinforcing portions" of the plugged honeycomb structure of Example 11 are shown in Table 2,

TABLE 2

|  | Area ratio (%) covered by reinforcing portions | Arrangement of reinforcing portions | Isostatic strength | Initial pressure loss | Capacity of deposited ash | Pressure loss at ash deposition |
| --- | --- | --- | --- | --- | --- | --- |
| Comparative Example 4 | — | None | Reference | Reference | Reference | Reference |
| Comparative Example 5 | 5% | All corner portions | A | C | B | C |
| Comparative Example 6 | 5% | All unspecific corner portions | A | C | B | C |
| Example 11 | 5% | All specific corner portions | A | B | B | B |
| Example 12 | 5% | 80% of specific corner portions | A | A | A | B |
| Example 13 | 5% | 50% of specific corner portions | A | A | A | A |
| Example 14 | 5% | 30% of specific corner portions | A | A | A | A |
| Example 15 | 5% | 10% of specific corner portions | B | A | A | A |
| Example 16 | 10% | 30% of specific corner portions | A | A | B | B |
| Example 17 | 20% | 30% of specific corner portions | A | B | B | B |

Examples 12 to 17

The procedures of Example 11 were repeated except that "an area ratio (%) covered by reinforcing portions" and "arrangement of the reinforcing portions" were changed as shown in Table 2, to manufacture plugged honeycomb structures. The obtained plugged honeycomb structures were subjected to evaluation of "isostatic strength", "initial pressure loss", "capacity of deposited ash", and "pressure loss at the ash deposition". The evaluation results are shown in Table 2. Additionally, in Example 12, specific corner portions corresponding to 80% of the specific corner portions of hexagonal cells were provided with reinforcing portions. In Example 13, specific corner portions corresponding to 50% of the specific corner portions of hexagonal cells were provided with reinforcing portions. In Examples 14, 16 and 17, specific corner portions corresponding to 30% of the specific corner portions of hexagonal cells were provided with reinforcing portions. In Example 15, specific corner portions corresponding to 10% of the specific corner portions of hexagonal cells were provided with reinforcing portions.

Comparative Example 4

The procedures of Example 11 were repeated except that specific corner portions and unspecific corner portions were not provided with reinforcing portions, to manufacture a plugged honeycomb structure. The obtained plugged honeycomb structure was subjected to evaluation of "isostatic strength", "initial pressure loss", "capacity of deposited ash", and "pressure loss at the ash deposition". The evaluation results are shown in Table 2.

Comparative Example 5

The procedures of Example 11 were repeated except that all corner portions including specific corner portions and unspecific corner portions were provided with reinforcing portions, to manufacture a plugged honeycomb structure. The obtained plugged honeycomb structure was subjected to evaluation of "isostatic strength", "initial pressure loss", "capacity of deposited ash", and "pressure loss at the ash deposition". The evaluation results are shown in Table 2.

Comparative Example 6

The procedures of Example 11 were repeated except that all unspecific corner portions were provided with reinforcing portions and all specific corner portions were not provided with the reinforcing portions, to manufacture a plugged honeycomb structure. The obtained plugged honeycomb structure was subjected to evaluation of "isostatic strength", "initial pressure loss", "capacity of deposited ash", and "pressure loss at the ash deposition". The evaluation results are shown in Table 2.

Conclusion 2

As shown in Table 2, when the plugged honeycomb structure of Comparative Example 4 was used as a reference, in the plugged honeycomb structures of Examples 11 to 17, it was possible to enhance the isostatic strength, and it was possible to suppress an increase in initial pressure loss and a decrease in capacity of the deposited ash. Moreover, it has been confirmed that it was possible to suppress an increase in pressure loss at the ash deposition.

On the other hand, in the plugged honeycomb structures of Comparative Examples 5 and 6, the isostatic strength enhanced, but the initial pressure loss increased, and furthermore, the pressure loss at the ash deposition increased as much as 30% or more.

Example 18

The procedures of Example 1 were repeated except that a hexagonal cell shape was formed as in a plugged honeycomb structure 300 shown in FIG. 8, FIG. 9A and FIG. 9B, to manufacture a plugged honeycomb structure. The obtained plugged honeycomb structure was subjected to evaluation of "isostatic strength", "initial pressure loss", "capacity of deposited ash", and "pressure loss at the ash deposition". The evaluation results are shown in Table 3.

In the plugged honeycomb structure of Example 18, a shape of inflow cells was a regular hexagonal shape having one side of 1.00 mm. Moreover, in a shape of outflow cells, among six sides of the hexagonal shape, a length of each of two sides adjacent to the inflow cells via partition walls (i.e., long sides) was 1.00 mm, and a length of each of four sides adjacent to the outflow cells via partition walls (i.e., short sides) was 0.28 mm. In the plugged honeycomb structure of Example 18, all corner portions that became specific corner portions were provided with reinforcing portions. "An area ratio (%) covered by the reinforcing portions" and "arrangement of the reinforcing portions" of the plugged honeycomb structure of Example 18 are shown in Table 3.

TABLE 3

|  | Area ratio (%) covered by reinforcing portions | Arrangement of reinforcing portions | Isostatic strength | Initial pressure loss | Capacity of deposited ash | Pressure loss at ash deposition |
| --- | --- | --- | --- | --- | --- | --- |
| Comparative Example 7 | — | None | Reference | Reference | Reference | Reference |
| Comparative Example 8 | 5% | All corner portions | A | C | C | C |
| Example 18 | 5% | All specific corner portions | A | B | A | B |
| Example 19 | 5% | All first specific corner portions | A | A | A | AA |
| Example 20 | 5% | Only 80% of first specific corner portions | A | A | A | AA |
| Example 21 | 5% | 80% of specific corner portions | A | B | A | A |
| Example 22 | 5% | 50% of specific corner portions | A | A | A | A |
| Example 23 | 5% | 30% of specific corner portions | A | A | A | A |
| Example 24 | 5% | 10% of specific corner portions | B | A | A | A |
| Example 25 | 10% | 30% of specific corner portions | A | A | A | B |
| Example 26 | 20% | 30% of specific corner portions | A | B | A | B |

Examples 19 to 26

The procedures of Example 18 were repeated except that "an area ratio (%) covered by reinforcing portions" and "arrangement of the reinforcing portions" were changed as shown in Table 3, to manufacture plugged honeycomb structures. The obtained plugged honeycomb structures were subjected to evaluation of "isostatic strength", "initial pressure loss", "capacity of deposited ash", and "pressure loss at the ash deposition". The evaluation results are shown in Table 3. Additionally, in Example 19, all first specific corner portions were provided with reinforcing portions. Specifically, in Example 19, unspecific corner portions and second specific corner portions were not provided with the reinforcing portions. In Example 20, first specific corner portions corresponding to 80% of all the first specific corner portions were provided with reinforcing portions. Specifically, in Example 20, the remaining first specific corner portions corresponding to 20% of all the first specific corner portions, unspecific corner portions and second specific corner portions were not provided with the reinforcing portions. In Example 21, specific corner portions corresponding to 80% of the specific corner portions of hexagonal cells were provided with reinforcing portions. In Example 22, specific corner portions corresponding to 50% of the specific corner portions of hexagonal cells were provided with reinforcing portions. In Examples 23, 25 and 26, specific corner portions corresponding to 30% of the specific corner portions of hexagonal cells were provided with reinforcing portions. In Example 24, specific corner portions corresponding to 10%; of the specific corner portions of hexagonal cells were provided with reinforcing portions.

Comparative Example 7

The procedures of Example 18 were repeated except that specific corner portions and unspecific corner portions were not provided with reinforcing portions, to manufacture a plugged honeycomb structure. The obtained plugged honeycomb structure was subjected to evaluation of "isostatic strength", "initial pressure loss", "capacity of deposited ash", and "pressure loss at the ash deposition". The evaluation results are shown in Table 3.

Comparative Example 8

The procedures of Example 18 were repeated except that all corner portions including specific corner portions and unspecific corner portions were provided with reinforcing portions, to manufacture a plugged honeycomb structure. The obtained plugged honeycomb structure was subjected to evaluation of "isostatic strength", "initial pressure loss", "capacity of deposited ash", and "pressure loss at the ash deposition". The evaluation results are shown in Table 3.

Conclusion 3

As shown in Table 3, when the plugged honeycomb structure of Comparative Example 7 was used as a reference, in the plugged honeycomb structures of Examples 18 to 26, it was possible to enhance the isostatic strength, and it was possible to suppress an increase in initial pressure loss and a decrease in capacity of the deposited ash. Moreover, it has been confirmed that it was possible to suppress an increase in pressure loss at the ash deposition. Especially, in Examples 19 and 20 in which first specific corner portions were preferentially provided with reinforcing portions, it was possible to effectively suppress the decrease in capacity of the deposited ash, and hence an evaluation result of the pressure loss at the ash deposition was remarkably suitable. On the other hand, in the plugged honeycomb structure of Comparative Example 8, the isostatic strength enhanced, but the initial pressure loss and the pressure loss at the ash deposition noticeably increased.

Example 27

The procedures of Example 1 were repeated except that a hexagonal cell shape was formed as in a plugged honeycomb structure 400 shown in FIG. 10, FIG. 11A and FIG. 11B, to manufacture a plugged honeycomb structure. The obtained plugged honeycomb structure was subjected to evaluation of "isostatic strength", "initial pressure loss", "capacity of deposited ash", and "pressure loss at the ash deposition". The evaluation results are shown in Table 4. In the plugged honeycomb structure of Example 27, a shape of outflow cells was a regular hexagonal shape having one side of 0.80 mm. Moreover, in a shape of each inflow cell, among six sides of the hexagonal shape, a length of each of two sides adjacent to the outflow cells via partition walls (i.e., long sides) was 0.80 mm, and a length of each of four sides adjacent to the inflow cells via partition walls (i.e., short sides) was 0.31 mm. In the plugged honeycomb structure of Example 27, all corner portions that became specific corner portions were provided with reinforcing portions. "An area ratio (%) covered by the reinforcing portions" and "arrangement of the reinforcing portions" of the plugged honeycomb structure of Example 27 are shown in Table 4.

TABLE 4

| | Area ratio (%) covered by reinforcing portions | Arrangement of reinforcing portions | Isostatic strength | Initial pressure loss | Capacity of deposited ash | Pressure loss at ash deposition |
|---|---|---|---|---|---|---|
| Comparative Example 9 | — | None | Reference | Reference | Reference | Reference |
| Comparative Example 10 | 5% | All corner portions | A | C | B | C |
| Example 27 | 5% | All specific corner portions | A | B | B | B |
| Example 28 | 5% | All first specific corner portions | A | A | A | A |
| Example 29 | 5% | Only 80% of first specific corner portions | A | A | A | A |
| Example 30 | 5% | 80% of specific corner portions | A | A | A | A |
| Example 31 | 5% | 50% of specific corner portions | A | A | A | A |
| Example 32 | 5% | 30% of specific corner portions | A | A | A | A |
| Example 33 | 5% | 10% of specific corner portions | B | A | A | A |
| Example 34 | 10% | 30% of specific corner portions | A | A | B | B |
| Example 35 | 20% | 30% of specific corner portions | A | B | B | B |

Examples 28 to 35

The procedures of Example 27 were repeated except that "an area ratio (%) covered by reinforcing portions" and "arrangement of the reinforcing portions" were changed as shown in Table 4, to manufacture plugged honeycomb structures. The obtained plugged honeycomb structures were subjected to evaluation of "an isostatic strength", "an initial pressure loss", "a capacity of deposited ash", and "a pressure loss at the ash deposition". The evaluation results are shown in Table 4. Additionally, in Example 28, all first specific corner portions were provided with reinforcing portions. Specifically, in Example 28, unspecific corner portions and second specific corner portions were not provided with the reinforcing portions. In Example 29, first specific corner portions corresponding to 80% of all the first specific corner portions were provided with reinforcing portions. Specifically, in Example 29, the remaining first specific corner portions corresponding to 20% of all the first specific corner portions, unspecific corner portions and second specific corner portions were not provided with the reinforcing portions. In Example 30, specific corner portions corresponding to 80% of the specific corner portions of hexagonal cells were provided with reinforcing portions. In Example 31, specific corner portions corresponding to 50% of the specific corner portions of hexagonal cells were provided with reinforcing portions. In Examples 32, 34 and 35, specific corner portions corresponding to 30% of the specific corner portions of hexagonal cells were provided with reinforcing portions. In Example 33, specific corner portions corresponding to 10% of the specific corner portions of hexagonal cells were provided with reinforcing portions.

Comparative Example 9

The procedures of Example 27 were repeated except that specific corner portions and unspecific corner portions were not provided with reinforcing portions, to manufacture a plugged honeycomb structure. The obtained plugged honeycomb structure was subjected to evaluation of "an isostatic strength", "an initial pressure loss", "a capacity of deposited ash", and "a pressure loss at the ash deposition". The evaluation results are shown in Table 4.

Comparative Example 10

The procedures of Example 27 were repeated except that all corner portions including specific corner portions and unspecific corner portions were provided with reinforcing portions, to manufacture a plugged honeycomb structure. The obtained plugged honeycomb structure was subjected to evaluation of "an isostatic strength", "an initial pressure loss", "a capacity of deposited ash", and "a pressure loss at the ash deposition". The evaluation results are shown in Table 4.

Conclusion 4

As shown in Table 4, when the plugged honeycomb structure of Comparative Example 9 was used as a reference, in the plugged honeycomb structures of Examples 27 to 35, it was possible to enhance the isostatic strength, and it was possible to suppress an increase in initial pressure loss and a decrease in capacity of the deposited ash. Moreover, it has been confirmed that it was possible to suppress an increase in pressure loss at the ash deposition. On the other hand, in the plugged honeycomb structures of Comparative Example 10, the isostatic strength enhanced, but the initial pressure loss and the pressure loss at the ash deposition increased.

INDUSTRIAL APPLICABILITY

A plugged honeycomb structure of the present invention can suitably be utilized as a filter to purify gases discharged from an internal combustion engine such as a diesel engine, various burning devices and the like.

DESCRIPTION OF REFERENCE NUMERALS

1: partition wall, 2: cell, 2a: inflow cell, 2b: outflow cell, 3: outer peripheral wall, 4: honeycomb structure body, 5a: inflow side plugged portion, 5b: outflow side plugged portion, 6: reinforcing portion, 11: inflow side end surface, 12: outflow side end surface, 15: corner portion, 15a: specific corner portion, 15b: unspecific corner portion, 21: partition wall, 22: cell, 22a: inflow cell, 22b: outflow cell, 23: outer peripheral wall, 24: honeycomb structure body, 25a: inflow side plugged portion, 25b: outflow side plugged portion, 26: reinforcing portion, 31: inflow side end surface, 32: outflow side end surface, 35: corner portion, 35a: specific corner portion, 35b: unspecific corner portion, 41: partition wall, 42: cell, 42a: inflow cell, 42b: outflow cell, 43: outer peripheral wall, 44: honeycomb structure body, 45a: inflow side plugged portion, 45b: outflow side plugged portion, 46: reinforcing portion, 51: inflow side end surface, 52: outflow side end surface, 55: corner portion, 55a: specific corner portion, 55b: unspecific corner portion, 55aa: first specific corner portion, 55ab: second specific corner portion, 61: partition wall, 62: cell, 62a: inflow cell, 62b: outflow cell, 63: outer peripheral wall, 64: honeycomb structure body, 65a: inflow side plugged portion, 65b: outflow side plugged portion, 66: reinforcing portion, 71: inflow side end surface, 72: outflow side end surface, 75: corner portion, 75a: specific corner portion, 75b: unspecific corner portion, 75aa: first specific corner portion, 75ab: second specific corner portion, 100, 200, 300, 400 and 500: plugged honeycomb structure, L: long axis, and P: tangent line.

What is claimed is:

1. A plugged honeycomb structure comprising:
a honeycomb structure body having porous partition walls with which a plurality of cells extending from an inflow side end surface to an outflow side end surface are formed to define through channels of a fluid, said plurality of cells including inflow cells and outflow cells;
outflow side plugged portions arranged in open frontal areas of predetermined cells at the outflow side end surface; and
inflow side plugged portions arranged in open frontal areas of the remaining cells at the inflow side end surface,
wherein a shape of the cells in a cross section perpendicular to an extending direction of the cells is a hexagonal shape, and
when among six corner portions of each of the hexagonal cells, a corner portion between two sides which are two partition walls constituting the corner portion and at least one of which is a partition wall separating inflow cells or outflow cells from each other is a specific corner portion, and a corner portion between two sides which are two partition walls constituting the corner portion and each of which is a partition wall separating an inflow cell and an outflow cell is an unspecific corner portion, the inflow cells being open at the inflow side end surface and being plugged with the outflow side plugged portions at the outflow side end surface, the outflow cells being open at the outflow side end surface and being plugged with the inflow side plugged portions at the inflow side end surface,
at least one of the specific corner portions is provided with a reinforcing portion so that a shape of the specific corner portion is rounded, and the unspecific corner portions are not provided with the reinforcing portions.

2. The plugged honeycomb structure according to claim 1, wherein only the specific corner portions between two sides which are the partition walls separating the inflow cells or the outflow cells from each other are provided with the reinforcing portion.

3. The plugged honeycomb structure according to claim 1, wherein a ratio of the number of the specific corner portions provided with the reinforcing portions to the number of the specific corner portions is 10% or more.

4. The plugged honeycomb structure according to claim 2, wherein a ratio of the number of the specific corner portions provided with the reinforcing portions to the number of the specific corner portions is 10% or more.

5. The plugged honeycomb structure according to claim 3, wherein the ratio of the number of the specific corner portions provided with the reinforcing portions to the number of the specific corner portions is 10% or more and 80% or less.

6. The plugged honeycomb structure according to claim 4, wherein the ratio of the number of the specific corner portions provided with the reinforcing portions to the number of the specific corner portions is 10% or more and 80% or less.

7. The plugged honeycomb structure according to claim 1, wherein a ratio of a total area covered by the reinforcing portions in the cross section perpendicular to the cell extending direction to a sum of areas of the cells in the cross section perpendicular to the cell extending direction is 20% or less.

8. The plugged honeycomb structure according to claim 2, wherein a ratio of a total area covered by the reinforcing portions in the cross section perpendicular to the cell extending direction to a sum of areas of the cells in the cross section perpendicular to the cell extending direction is 20% or less.

9. The plugged honeycomb structure according to claim 3, wherein a ratio of a total area covered by the reinforcing portions in the cross section perpendicular to the cell extending direction to a sum of areas of the cells in the cross section perpendicular to the cell extending direction is 20% or less.

10. The plugged honeycomb structure according to claim 1, wherein only the specific corner portions of the outflow cells are provided with the reinforcing portions.

11. The plugged honeycomb structure according to claim 2, wherein only the specific corner portions of the outflow cells are provided with the reinforcing portions.

12. The plugged honeycomb structure according to claim 3, wherein only the specific corner portions of the outflow cells are provided with the reinforcing portions.

13. The plugged honeycomb structure according to claim 1, wherein a shape of the inflow cells in the cross section perpendicular to the cell extending direction is different from a shape of the outflow cells in the cross section perpendicular to the cell extending direction.

14. The plugged honeycomb structure according to claim 2, wherein a shape of the inflow cells in the cross section perpendicular to the cell extending direction is different from a shape of the outflow cells in the cross section perpendicular to the cell extending direction.

15. The plugged honeycomb structure according to claim 3, wherein a shape of the inflow cells in the cross section perpendicular to the cell extending direction is different from a shape of the outflow cells in the cross section perpendicular to the cell extending direction.

16. The plugged honeycomb structure according to claim 1, wherein a sum of areas of through channel portions of the inflow cells in the cross section perpendicular to the cell extending direction is larger than a sum of areas of through channel portions of the outflow cells in the cross section perpendicular to the cell extending direction.

17. The plugged honeycomb structure according to claim 1, wherein in the cross section of the honeycomb structure body which is perpendicular to the cell extending direction, 70% or more of the specific corner portions provided with the reinforcing portions are present in a region of a length from an outer peripheral edge of the honeycomb structure body in a normal direction of the outer peripheral edge, the length corresponding to the length of ⅓ or less of a length of a long axis of the outer peripheral edge.

* * * * *